United States Patent [19]
Yamamoto et al.

[11] Patent Number: 5,763,517

[45] Date of Patent: Jun. 9, 1998

[54] THERMOPLASTIC RESIN COMPOSITION AND MOLDED PRODUCT THEREOF

[75] Inventors: Sanehiro Yamamoto; Kazuto Sugiyama; Akinori Toyota; Yoshikatsu Amimoto; Fumitoshi Ikejiri, all of Waki-cho, Japan

[73] Assignee: Mitsui Petrochemical Industries, Ltd., Tokyo, Japan

[21] Appl. No.: 721,272

[22] Filed: Sep. 26, 1996

Related U.S. Application Data

[63] Continuation of Ser. No. 336,411, Dec. 29, 1994, abandoned, which is a continuation of Ser. No. 32,992, Mar. 17, 1993, abandoned.

[30] Foreign Application Priority Data

Mar. 19, 1992 [JP] Japan ............................ 4-064088
Dec. 25, 1992 [JP] Japan ............................ 4-347190

[51] Int. Cl.$^6$ ............................................. G08L 77/00
[52] U.S. Cl. ............................ 524/302; 524/311; 524/504
[58] Field of Search .................................. 524/302, 311, 524/504

[56] References Cited

U.S. PATENT DOCUMENTS 3,772,403  11/1973  Wells ........................... 260/857

FOREIGN PATENT DOCUMENTS

| 1133174 | 10/1982 | Canada. |
|---|---|---|
| 1307363 | 9/1992 | Canada. |
| 1322797 | 10/1993 | Canada. |
| 1322798 | 10/1993 | Canada. |
| 0203799 | 12/1986 | European Pat. Off.. |
| 0382559 | 8/1990 | European Pat. Off.. |
| 0458365 | 11/1991 | European Pat. Off.. |

OTHER PUBLICATIONS

Patent Abstracts of Japan, vol. 006, No. 219 (C-132), Nov. 2, 1982 Abstract of JP-A 57 123 254.

Patent Abstracts of Japan, vol. 014, No. 513 (C-0777), Nov. 9, 1990 Abstract of JP-A-02 212 533.

*Primary Examiner*—Ana Woodward
*Attorney, Agent, or Firm*—Sherman and Shalloway

[57] ABSTRACT

The thermoplastic resin composition of the present invention comprises (A) polyamide having a melting point of not lower than 280° C., particularly preferably (A-1) specific polyamide having a melting point of higher than 300° C., (B) a specific modified polymer, (C) a hindered phenol type antioxidant having a molecular weight of not less than 500 and a TGA 10% weight loss temperature of not lower than 300° C., and (D) a sulfur type antioxidant having a molecular weight of not less than 600 and a TGA 10% weight loss temperature of not lower than 280° C. The molded product of the present invention is made of the above-mentioned thermoplastic resin composition. The thermoplastic resin composition of the invention is excellent in heat stability.

15 Claims, No Drawings

THERMOPLASTIC RESIN COMPOSITION AND MOLDED PRODUCT THEREOF

This application is a continuation of application Ser. No. 08/336,411, filed Dec. 29, 1994, which is a continuation of application Ser. No. 08/032,992 filed Mar. 17, 1993 both now abandoned.

FIELD OF THE INVENTION

The present invention relates to a thermoplastic resin composition having excellent heat resistance and a molded product made of this thermoplastic resin composition. More particularly, the invention relates to a lightweight thermoplastic resin composition which is hardly reduced in toughness even after heating and is hardly reduced in heat resistance for a long period of time, and also relates to a molded product made of this thermoplastic resin composition.

BACKGROUND OF THE INVENTION

Because of their excellent properties such as heat resistance, oil resistance, moldability, rigidity and toughness, polyamide resins have been used as resins for forming various functional parts such as electric tools, ordinary industrial parts, mechanical parts, electronic parts, automotive interior or exterior trim parts, engine room parts and automotive electrical parts. In these uses, the polyamide resins are required to have extremely high heat resistance, and hence aliphatic polyamides conventionally used have come to be replaced with high-melting polyamides such as polyamide 46, polyamide 6T6, polyamide 6T10, polyamide 6TI, polyamide 6TI6, polyamide 6TI10, polyamide MXD6 and polyamide PXD6.

Of the high-melting polyamides, polyamide obtained by using an aromatic dicarboxylic acid as a dicarboxylic acid component and subjecting this aromatic dicarboxylic acid and diamine to polycondensation reaction, namely, aromatic polyamide, is particularly high in the melting point and excellent in short-term heat resistance. Further, since the aromatic polyamide has a low water absorption rate in addition to the above-mentioned excellent short-term heat resistance, there is such an advantage that a molded product prepared from the aromatic polyamide is free from reduction of dimensional accuracy and variability of physical properties which are caused in association with the water absorption of the molded product However, a processing temperature of the aromatic polyamide is higher than that of the aliphatic polyamide, because the aromatic polyamide has a high melting point. Therefore, problems such as heat deterioration and gas burning tend to occur when a molded product is prepared from the aromatic polyamide. Further, the aromatic polyamide is not so good with respect to long-term heat resistance although it is excellent in the short-term heat resistance, and hence the molded product is markedly embrittled when used at a high temperature for a long period of time.

Some of the molded products prepared from the aromatic polyamide, for example, mechanical parts such as automotive parts, are exposed high temperatures over a long period of time, and for the purpose of enhancing reliability of these parts, it has been eagerly desired to improve the long-term heat resistance of resin molded products.

As described before, polyamide formed from an aromatic dicarboxylic acid (as a dicarboxylic acid component) and a diamine, namely, aromatic polyamide, is particularly high in the melting point and is excellent in the short-term heat resistance. In addition to this particularly excellent short-term heat resistance, the aromatic polyamide has a low water absorption rate, so that there is such an advantage that a molded product formed from the aromatic polyamide is free from reduction of dimensional accuracy and variability of physical properties which are caused by the water absorption of the molded product.

However, there is yet room for improvement in the mechanical properties of the aromatic polyamide, and various proposals have been made in order to enhance toughness of the high-melting polyamide, such as stretchability and impact resistance. For improving these properties and reducing the water absorption rate, a polymer alloy comprising the aromatic polyamide and a polyolefin or rubber, etc. has been proposed. One example of the polymer alloy is proposed in Japanese Patent Application No. 3(1991)-312733 applied by the present applicant. In concrete, this composition comprises polyamide and a specific modified α-olefin polymer. A molded product formed from this composition is prominently improved in toughness such as stretchability and impact resistance. That is, if the high-melting polyamide and polyolefin or rubber are alloyed, there can be obtained a resin composition capable of forming a molded product which is excellent in both of heat resistance and toughness.

However, the high-melting polyamide or a polymer alloy of this high-melting polyamide and polyolefin or rubber is required to be processed at a high temperature, for example, during the preparation stage of a composition or the molding stage. Accordingly, problems such as heat deterioration and gas burning tend to occur in those stages. Further, a molded product formed from the polyamide or the polymer alloy is not so good in the long-term heat resistance although it is excellent in the short-term heat resistance, and hence the molded product is sometimes markedly deteriorated when used at a high temperature for a long period of time.

Some mechanical parts such as automotive parts are used at high temperatures over a long period of time, and for the purpose of enhancing reliability of these parts, it has been eagerly desired to improve the long-term heat resistance of resin molded products.

For improving heat resistance of polyamide, there is known a method of adding various stabilizers to the polyamide, as well as the above-mentioned method of adding other resins to the polyamide. For example, Japanese Patent Laid-Open Publications No. 2(1990)-212533, No. 2(1990)-214752, No. 2(1990)-173059 and No. 62(1987)-273256 disclose polyamide resin compositions comprising a specific phenol type stabilizer, a specific sulfur type stabilizer and a specific phosphorus type stabilizer, and an aliphatic polyamide such as polyamide 66 or polyamide(ε-caprolactam)/66. An aliphatic polyamide is contained in the composition and the melting point of this aliphatic polyamide is much lower than that of the aromatic polyamide. Molded products formed from the compositions comprising the above-mentioned stabilizers and the aliphatic polyamide as described in the above publications exhibit excellent properties, but there is a problem if those stabilizers are added to aromatic polyamides. That is, because of high melting point of the aromatic polyamide, foaming of the stabilizers is brought about during the preparation of a composition or the molding of the composition.

Japanese Patent Laid-Open Publication No. 57(1982)-123254 discloses a composition comprising polyamide, a specific phenol type stabilizer, a specific sulfur type stabilizer and a copper compound. In this composition, the copper compound is used as an essential component to exhibit sufficient thermal aging resistance, and hence the composition can be improved in heat stability by using the copper compound in combination with the specific phenol type stabilizer and the specific sulfur type stabilizer. However, the composition sometimes suffers evil effects of metal caused by the copper compound which is added as the stabilizer. In other words, formulation of stabilizers having been conventionally applied to the aliphatic polyamide is contrived for the aliphatic polyamide, and this formulation is not always satisfactory for the aromatic polyamide.

OBJECT OF THE INVENTION

It is an object of the present invention to provide a thermoplastic resin composition excellent in both of impact strength and heat resistance and suitable for preparing a lightweight molded product, and to provide a molded product formed from this thermoplastic resin composition.

It is another object of the present invention to provide a thermoplastic resin composition which is free from foaming during the preparation of the composition and the processing procedure such as a molding procedure of the composition, has no evil effects of metal, and free from gas burning during the molding procedure and which can form a molded product excellent in heat resistance, toughness, low water absorption properties and thermal aging resistance, and to provide a molded product formed from this thermoplastic resin composition.

SUMMARY OF THE INVENTION

The thermoplastic resin composition (first thermoplastic resin composition) of the invention is a thermoplastic resin composition comprising:

(A) a polyamide having a melting point of not lower than 280° C., (B) at least one modified polymer selected from the group consisting of a graft-modified α-olefin polymer, a graft-modified product of a ring opening polymer of cycloolefin represented by the following formula [III] or [IV] or a graft-modified product of a cycloolefin copolymer which is an addition polymer of said cycloolefin and ethylene, a graft-modified aromatic vinyl type hydrocarbon/conjugated diene copolymer or a hydrogenation product thereof, and an ethylene copolymer containing a carboxyl group and a carboxylic metal salt in the side chain, (C) a hindered phenol type antioxidant having a molecular weight of not less than 500 and a 10% weight loss temperature of not lower than 300° C. in a thermogram measured in air; and (D) a sulfur type antioxidant having a molecular weight of not less than 600 and a 10% weight loss temperature of not lower than 280° C. in a thermogram measured in air;

wherein, the modified polymer (B) is contained in an amount of 2 to 100 parts by weight based on 100 parts by weight of the polyamide (A);

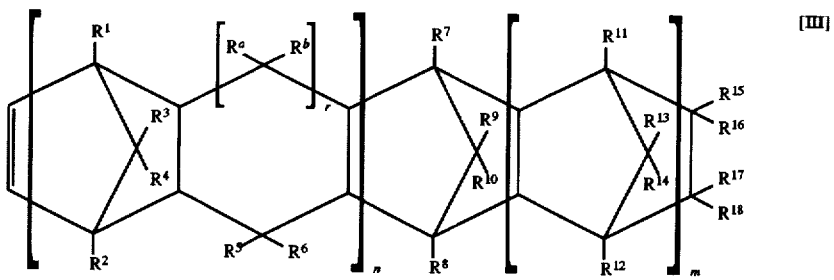

wherein n is 0 or 1; m is 0 or a positive integer; r is 0 or 1; $R^1$ to $R^{18}$, $R^a$ and $R^b$ are each independently an atom or a group selected from the group consisting of a hydrogen atom, a halogen atom and a hydrocarbon group; $R^{15}$ to $R^{18}$ may be linked to each other to form a monocyclic or polycyclic group which may have a double bond; and $R^{15}$ and $R^{16}$, or $R^{17}$ and $R^{18}$ may form together an alkylidene group;

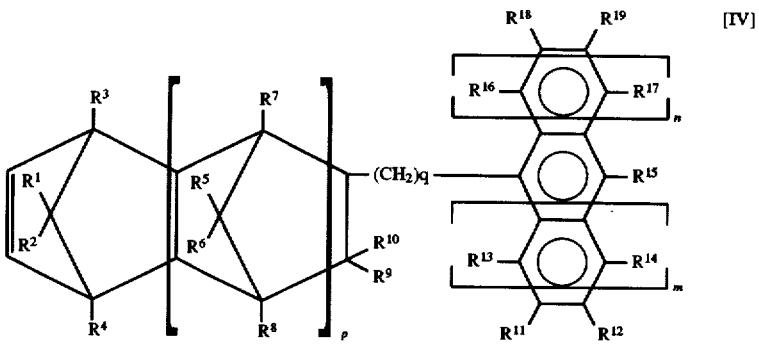

wherein each of p and q is 0 or an integer of 1 or more; each of m and n is 0, 1 or 2; $R^1$ to $R^{19}$ are each independently an atom or a group selected from the group consisting of a hydrogen atom, a halogen atom, an aliphatic hydrocarbon group, an alicyclic hydrocarbon group, an aromatic hydrocarbon group and an alkoxy group; a carbon atom to which $R^9$ is bonded and a carbon atom to which $R^{13}$ is bonded, or a carbon atom to which $R^{10}$ is bonded and a carbon atom to which $R^{11}$ is bonded may be linked to each other directly or by way of an alkylene group of 1 to 3 carbon atoms; and $R^{15}$ and $R^{12}$, or $R^{15}$ and $R^{19}$ may be linked to each other to form a monocyclic or polycyclic aromatic ring when each of n and m is 0.

Especially in the case of using the following specific aromatic polyamide (A-1) as the aromatic polyamide (A), the resultant composition (second thermoplastic resin composition of the invention) shows prominently high heat resistance.

This specific aromatic polyamide (A-1) is aromatic polyamide comprising repeating units formed from:

dicarboxylic acid constituent units comprising 40–100% by mol of terephthalic acid constituent units, 0–50 % by mol of aromatic dicarboxylic acid constituent units other than terephthalic acid constituent units and/or 0–60% by mol of aliphatic dicarboxylic acid constituent units having 4 to 20 carbon atoms, and diamine constituent units comprising aliphatic diamine constituent units and/or alicyclic diamine constituent units, said aromatic polyamide having an intrinsic viscosity, as measured in a concentrated sulfuric acid at 30° C., of 0.5 to 3.0 dl/g and a melting point of higher than 290° C.

In the case of using the aromatic polyamide (A-1) as the aromatic polyamide (A), the sulfur type antioxidant (D) preferably is a sulfur type antioxidant represented by the following formula [VI]:

wherein $R^1$ is a hydrocarbon group of 3 to 20 carbon atoms, and $R^2$ is a divalent hydrocarbon group of 1 to 5 carbon atoms.

Further, the sulfur type antioxidant (D) is particularly preferably penta(erythrityl-tetra-β-mercaptolauryl) propionate.

The molded product of the present invention is formed from the above-mentioned first or second thermoplastic resin composition.

The first thermoplastic resin composition of the invention comprises, as resin components, (A) polyamide having a melting point of not lower than 280° C. and (B) a specific modified polymer, and further comprising antioxidants of (C) a hindered phenol type antioxidant having a molecular weight of not less than 500 and a 10% weight loss temperature of not lower than 300° C. in a thermogram measured in air and (D) a sulfur type antioxidant having a molecular weight of not less than 600 and a 10% weight loss temperature of not lower than 280° C. in a thermogram measured in air. Owing to these components, no foaming occurs even under heating during the preparation of a composition, no evil effect of metal is produced, and no gas burning takes place when the composition is molded. Moreover, the resultant resin composition can be molded into a molded product which is excellent in heat resistance, low water absorption properties and thermal aging resistance.

The second thermoplastic resin composition of the present invention comprises a specific aromatic polyamide (A-1) as the polyamide (A) and a specific compound as the sulfur type stabilizer in the above-mentioned first thermoplastic resin composition. Due to those components, there can be obtained a resin composition much more improved in the thermal aging resistance and capable of forming a molded product free from gas burning.

Further, the second thermoplastic resin composition of the invention has various excellent properties of the first thermoplastic resin composition, and is particularly excellent in the heat resistance.

The molded product of the invention formed from such thermoplastic resin composition as mentioned above is excellent in the short-term heat resistance as well as in the long-term heat resistance.

DETAILED DESCRIPTION OF THE INVENTION

The thermoplastic resin composition of the present invention and use thereof are described in detail hereinafter.

The thermoplastic resin composition of the invention comprises at least two kinds of resin components, namely, a polyamide having a specific melting point (A) and a specific modified polymer (B), and at least two kinds of antioxidants, namely, a specific hindered phenol type antioxidant (C) and a specific sulfur type antioxidant (D), all described below.

The polyamide (A) for the composition of the invention is a polyamide having a melting point of not lower than 280° C., preferably higher than 300° C. but not higher than 340° C.

When the polyamide having a melting point of not lower than 280° C. preferably higher than 300° C. but not higher than 340° C., a molded product formed from the composition of the invention can be improved in the thermal aging resistance.

The polyamide (A) having such a melting point as mentioned above includes a polyamide formed from diamine and a dicarboxylic acid and a copolymeric polyamide formed from diamine, a dicarboxylic acid and an aminocaproic acid or lactam.

Examples of the diamines used herein include:

aliphatic diamines such as 1,4-diaminobutane, 1,6-diaminohexane, 1,9-diaminononane, 1,10-diaminodecane, 1,12-diaminododecane, 2,2,4-trimethylhexamethylenediamine and 2,4,4-trimethylhexamethylenediamine;

alicyclic diamines such as 1,3-bis(aminomethyl) cyclohexane, 1,4-bis(aminomethyl)cyclohexane and bis(p-aminocyclohexylmethane); and aromatic diamines such as m-xylylenediamine and p-xylylenediamine.

Examples of the dicarboxylic acids include:

aliphatic dicarboxylic acids such as adipic acid, suberic acid, dodecanedicarboxylic acid and sebacic acid;

alicyclic dicarboxylic acids such as cyclohexanedicarboxylic acid; and aromatic dicarboxylic acids such as terephthalic acid, isophthalic acid, phthalic acid, naphthalenedicarboxylic acid and diphenyldicarboxylic acid.

Examples of the aminocaproic acids or lactams include ε-caprolactam and aminocaproic acid.

Concrete examples of the polyamides having a melting point of not lower than 280° C. which are prepared from the above-mentioned diamines and dicarboxylic acids or from the diamines, dicarboxylic acids and aminocaproic acids or lactams include polyamide 46, polyamide 6T, polyamide 6TI, polyamide 6T6, polyamide 6TI10, polyamide MXD6, polyamide PXD6 and polyamide (6T/6). These polyamides may be used singly or in combination.

The above-mentioned polyamide (A) has an intrinsic viscosity [η], as measured in a concentrated sulfuric acid at 30° C., of usually 0.5 to 3.0 dl/g, preferably 0.5 to 2.8 dl/g, particularly preferably 0.6 to 2.5 dl/g.

The polyamide for the thermoplastic resin composition of the invention has a melting point of not lower than 280° C. (A), as described above, and especially when the polyamide (A) is the aromatic polyamide (A-1) described below, the composition is excellent in heat stability.

The aromatic polyamide (A-1) used as the polyamide (A) in the invention comprises a specific dicarboxylic acid constituent unit [a] and a specific aliphatic diamine constituent unit or a specific alicyclic diamine constituent unit [b].

The specific dicarboxylic acid constituent unit [a] for the polyamide has a terephthalic acid constituent unit (a-1) as an essential constituent unit. The repeating unit having the terephthalic acid constituent unit (a-1) can be represented by the following formula [I-a]:

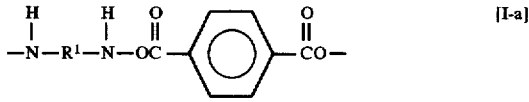

wherein $R^1$ is a divalent aliphatic or alicyclic hydrocarbon group, preferably an alkylene group of 4 to 18 carbon atoms.

All of the dicarboxylic acid constituent units [a] are not necessarily constituent units represented by the above formula [I-a], and a part of the above-mentioned terephthalic acid constituent units (a-1) may be other dicarboxylic acid constituent units.

The dicarboxylic acid constituent units other than terephthalic acid constituent units include (a-2) aromatic dicarboxylic acid constituent units other than terephthalic acid constituent units and (a-3) aliphatic dicarboxylic acid constituent units.

Examples of the aromatic dicarboxylic acid constituent units other than terephthalic acid constituent units (a-2) include isophthalic acid constituent unit, 2-methylterephthalic acid constituent unit and naphthalene dicarboxylic acid constituent unit. As the constituent unit derived from other aromatic dicarboxylic acid than the terephthalic acid, isophthalic acid constituent unit is particularly preferred.

Of the aromatic dicarboxylic acid constituent units other than terephthalic acid constituent units (a-2), a repeating unit having this preferred isophthalic acid constituent unit can be represented by the following formula [I-b]:

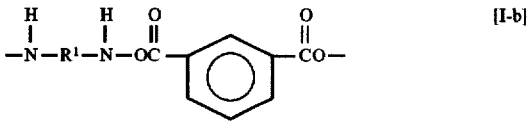

wherein $R^1$ is a divalent aliphatic or alicyclic hydrocarbon group, preferably an alkylene group of 4 to 18 carbon atoms.

The aliphatic dicarboxylic acid constituent unit (a-3) is derived from an aliphatic dicarboxylic acid having an alkylene group of generally 4 to 20 carbon atoms, preferably 6 to 12 carbon atoms. Examples of the aliphatic dicarboxylic acids employable for deriving the aliphatic dicarboxylic acid constituent units (a-3) include succinic acid, adipic acid, azelaic acid and sebacic acid. In the invention, particularly preferred as the aliphatic dicarboxylic acid constituent units are adipic acid constituent unit and sebacic acid constituent unit.

The repeating unit having the aliphatic dicarboxylic acid constituent unit (a-3) for forming the dicarboxylic acid constituent unit [a] can be represented by the following formula [II]:

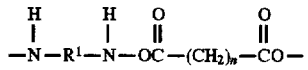

wherein $R^1$ has the same meaning as defined above, and n is an integer of generally 2 to 18, preferably 4 to 10.

The diamine constituent units [b] for forming the aromatic polyamide (A-1) together with the above-mentioned dicarboxylic acid constituent units can be derived from aliphatic alkylenediamine of 4 to 18 carbon atoms and alicyclic diamine.

Concrete examples of the aliphatic alkylenediamines include 1,4-diaminobutane, 1,6-diaminohexane, trimethyl-1,6-diaminohexane, 1,7-diaminoheptane, 1,8-diaminooctane, 1,9-diaminononane, 1,10-diaminodecane, 1,11-diaminoundecane and 1,12-diaminododecane. A concrete example of the alicyclic diamine is diaminocyclohexane.

Particularly preferred as the diamine constituent units in the invention are those derived from straight-chain aliphatic alkylenediamines. As the straight-chain aliphatic alkylenediamines, 1,6-diaminohexane, 1,8-diaminooctane, 1,10-diaminodecane and 1,12-diaminododecane are preferred. Also preferred are mixtures of those alkylenediamines. Of these, 1,6-diaminohexane is particularly preferred.

A content of the terephthalic acid constituent units (a-1) in all of the dicarboxylic acid constituents (100% by mol) for the aromatic polyamide (A-1) is in the range of 40 to 100% by mol, preferably 45 to 100% by mol, more preferably 50 to 100% by mol, most preferably 50 to 80% by mol; a content of other aromatic dicarboxylic acid constituent units than terephthalic acid constituent units (a-2) is in the range of 0 to 50% by mol, preferably 0 to 30% by mol; and a content of the aliphatic dicarboxylic acid constituent units (a-3) is in the range of 0 to 60% by mol, preferably 0 to 50% by mol, more preferably 0 to 20% by mol.

The aromatic polyamide (A-1) may contain constituent units derived from tribasic or more basic polyvalent carboxylic acid such as trimellitic acid or pyromellitic acid in a small amount, in addition to the above-mentioned aromatic dicarboxylic acid constituent units, namely, the terephthalic acid constituent units which are host constituent units, the constituent units derived from other divalent aromatic dicarboxylic acids than the terephthalic acid (typically isophthalic acid constituent units) and the aliphatic dicarboxylic acid constituent units. The constituent units derived from the polyvalent carboxylic acid are contained in the aromatic polyamide (A-1) for the composition of the invention generally in an amount of 0 to 5% by mol.

Further, the aromatic polyamide (A-1) used for forming the composition of the invention may be a mixture of aromatic polyamide mainly comprising the repeating units represented by the aforementioned formula [I-a] and aromatic polyamide mainly comprising the repeating units represented by the aforementioned formula [I-b]. In this case, a content of the aromatic polyamide mainly comprising the repeating units represented by the formula [I-a] is usually not less than 50% by weight, preferably not less than 60% by weight.

The aromatic polyamide (A-1) has an intrinsic viscosity [η], as measured in a concentrated sulfuric acid at 30° C., of usually 0.5 to 3.0 dl/g, preferably 0.5 to 2.8 dl/g, more preferably 0.6 to 2.5 dl/g. This aromatic polyamide (A) shows a melting point higher than that of aliphatic polyamide conventionally used. In detail, the aromatic polyamide (A-1) used in the invention has a melting point of higher than 290° C., preferably higher than 300° C. Particularly, a composition comprising the aromatic polyamide having a melting point of preferably 305° to 340° C., more preferably 310° to 340° C., is prominently excellent in the heat resistance. Further, the aromatic polyamide generally has a glass transition temperature of not lower than 80° C. at its non-crystalline portion. In the case of using the aromatic polyamide having a melting point of the above range and a glass transition temperature of the above range at the non-crystalline portion, the composition comprising the aromatic polyamide hardly becomes molten even when a molded product formed from the composition is exposed to a high temperature. Moreover, since the above-mentioned aromatic polyamide is excellent in moldability, a molded product can be easily formed from the composition comprising this aromatic polyamide. Furthermore, since this aromatic polyamide has a glass transition temperature of not lower than 80° C. at the non-crystalline portion as described above, a dimensional change of a molded product formed from the composition comprising the aromatic polyamide hardly takes place even when the molded product is exposed to a high temperature.

The aromatic polyamide shows a low value with respect to the water absorption properties, the water absorption properties being a problem for the conventional aliphatic polyamide.

The thermoplastic resin composition of the invention comprises at least one modified polymer (B) selected from the group consisting of a graft-modified α-olefin polymer (B-1), a graft-modified product of a ring opening polymer of specific cycloolefin or a graft-modified product of a cycloolefin copolymer which is an addition polymer of the specific cycloolefin and ethylene (B-2), a graft-modified aromatic vinyl type hydrocarbon/conjugated diene copolymer or a hydrogenation product thereof (B-3) and an ethylene copolymer containing a carboxyl group and a carboxylic metal salt in the side chain (B-4).

The graft-modified α-olefin polymer (B-1) used as the modified polymer (B) in the invention is a graft-modified α-olefin random elastic copolymer having low-crystalline to non-crystalline properties.

This graft-modified α-olefin random elastic copolymer (B-1) is a graft-modified product of a copolymer in which two kinds of repeating units derived from different α-olefins are arranged at random.

The graft-modified α-olefin random elastic copolymer is a low-crystalline to non-crystalline copolymer, preferably, substantially non-crystalline. In other words, a crystallinity of the copolymer, as measured by means of X-ray diffractometry, is not more than 10%, preferably not more than 5%, particularly preferably 0%. Accordingly, most of the graft-modified α-olefin random elastic copolymers show no definite melting point. Further, the graft-modified α-olefin random elastic copolymer is soft because of its low crystallinity, and this elastic copolymer has a tensile modulus of generally not less than 0.1 kg/cm$^2$ but less than 20,000 kg/cm$^2$, preferably in the range of 1 to 15,000 kg/cm$^2$.

A melt index of the graft-modified α-olefin random elastic copolymer (measured at 190° C.) is usually in the range of 0.1 to 30 g/10 min, preferably 1.0 to 20 g/10 min, particularly preferably 2.0 to 15 g/10 min, and a Mw/Mn value thereof measured by GPC is usually not more than 5.5, preferably not more than 4.5, particularly preferably not more than 3.5.

Further, the graft-modified α-olefin random elastic copolymer has a glass transition temperature (Tg) of usually −150° to +50° C., preferably −80° to −20° C., an intrinsic viscosity [η] as measured in decalin at 135° C. of usually 0.2 to 10 dl/g, preferably 1 to 5 dl/g, and a density of usually 0.82 to 0.96 g/cm$^3$, preferably 0.84 to 0.92 g/cm$^3$.

Concrete examples of the graft-modified α-olefin random elastic copolymer (B-1) having the above-mentioned properties include:

(i) a graft-modified ethylene/α-olefin copolymer rubber prepared using ethylene as a host component, and (ii) a graft-modified propylene/α-olefin copolymer rubber prepared using propylene as a host component.

The graft-modified α-olefin random elastic copolymer is described in more detail with reference to its typical examples, namely, the graft-modified ethylene/α-olefin copolymer rubber (i) and the graft-modified propylene/α-olefin copolymer rubber (ii).

As the α-olefin for forming the graft-modified ethylene/α-olefin copolymer rubber (i), α-olefin of 3 to 20 carbon atoms is generally employed. Examples of such α-olefin include propylene, 1-butene, 1-pentene, 1-hexene, 4-methyl-1-pentene, 1-octene, 1-decene and mixtures thereof. Of these, propylene and/or 1-butene is particularly preferred.

As the α-olefin for forming the graft-modified propylene/α-olefin copolymer rubber (ii), α-olefin of 4 to 20 carbon atoms is generally employed. Examples of such α-olefin include 1-butene, 1-pentene, 1-hexene, 4-methyl-1-pentene, 1-octene, 1-decene and mixtures thereof. Of these, 1-butene is particularly preferred.

The α-olefin random elastic copolymer may contain other constituent units than those derived from α-olefin, such as constituent units derived from diene compounds, with the proviso that the properties of the α-olefin random elastic copolymer are not marred.

Examples of the constituent units permitted to be contained in the α-olefin random elastic copolymer include:

constituent units derived from chain non-conjugated dienes such as 1,4-hexadiene, 1,6-octadiene, 2-methyl-1,5-hexadiene, 6-methyl-1,5-heptadiene and 7-methyl-1,6-octadiene;

constituent units derived from cyclic non-conjugated dienes such as cyclohexadiene, dicyclopentadiene, methyltetrahydroindene, 5-vinylnorbornene, 5-ethylidene-2-norbornene, 5-methylene-2-norbornene, 5-isopropylidene-2-norbornene and 6-chloromethyl-5-isopropenyl-2-norbornene;

constituent units derived from diene compounds such as 2,3-diisopropylidene-5-norbornene, 2-ethylidene-3-isopropylidene-5-norbornene and 2-propenyl-2,2-norbornadiene; and constituent units derived from cycloolefins.

These diene constituent units are contained in the α-olefin random elastic copolymer in an amount of generally not more than 10% by mol, preferably not more than 5% by mol.

In the graft-modified ethylene/α-olefin copolymer rubber (i), a molar ratio of ethylene to α-olefin (ethylene/α-olefin) varies depending on the kind of α-olefin, but the molar ratio is generally in the range of 10/90 to 99/1, preferably 50/50 to 95/5. When the α-olefin is propylene, the molar ratio is preferably in the range of 50/50 to 90/10, and when the α-olefin is (α-olefin of 4 or more carbon atoms, the molar ratio is preferably in the range of 80/20 to 95/5.

Examples of ethylene/α-olefin copolymer for the graft-modified ethylene/α-olefin copolymer rubber (i) include:

copolymers such as ethylene/propylene copolymer, ethylene/1-butene copolymer, ethylene/4-methyl-1-pentene copolymer, ethylene/1-hexene copolymer, ethylene/1-octene copolymer and ethylene/1-decene copolymer; and copolymers such as ethylene/propylene/1,4-hexadiene copolymer, ethylene/propylene/dicyclopentadiene copolymer, ethylene/propylene/5-ethylidene-2-norbornene copolymer, ethylene/propylene/2,5-norbornadiene copolymer, ethylene/1-butene/dicyclopentadiene copolymer, ethylene/1-butene/1,4-hexadiene copolymer and ethylene/1-butene/5-ethylidene-2-norbornene copolymer.

In the graft-modified propylene/α-olefin copolymer rubber (ii), a molar ratio of propylene to α-olefin (propylene/

α-olefin) varies depending on the kind of α-olefin, but the molar ratio is preferably in the range of 50/50 to 95/5. When the α-olefin is 1-butene, the molar ratio is preferably in the range of 50/50 to 90/10, and when the α-olefin is α-olefin of 5 or more carbon atoms, the molar ratio is preferably in the range of 80/20 to 95/5.

Examples of propylene/α-olefin copolymer for the graft-modified propylene/α-olefin copolymer rubber (ii) include:

copolymers such as propylene/1-butene copolymer, propylene/4-methyl-1-pentene copolymer, propylene/1-hexene copolymer, propylene/1-octene copolymer, propylene/1-decene copolymer, propylene/dicyclopentadiene copolymer, propylene/5-ethylidene-2-norbornene copolymer and propylene/2,5-norbornadiene copolymer; and copolymers such as propylene/1-butene/dicyclopentadiene copolymer, propylene/1-butene/1,4-hexadiene copolymer and propylene/1-butene/5-ethylidene-2-norbornene copolymer.

The graft-modified α-olefin random elastic copolymer (B-1) for the composition of the invention is prepared by graft-modifying the unmodified (α-olefin random elastic copolymer mentioned as above using unsaturated carboxylic acids, unsaturated carboxylic anhydrides or unsaturated carboxylic acid derivatives.

Examples of the unsaturated carboxylic acids used herein include acrylic acid, methacrylic acid, α-ethylacrylic acid, maleic acid, fumaric acid, itaconic acid, citraconic acid, tetrahydrophthalic acid, methyltetrahydrophthalic acid, endocis-bicyclo[2.2.1]hepto-5-ene-2,5-dicarboxylic acid (nadic acid$_{TM}$) and methyl-endocis-bicyclo[2.2.1]hepto-5-ene-2,5-dicarboxylic acid (methylnadic acid$_{TM}$). Examples of the unsaturated carboxylic anhydrides preferably used include maleic anhydride, citraconic anhydride, nadic anhydride and methylnadic anhydride. Examples of the unsaturated carboxylic acid derivatives include acid halide compounds of the above-mentioned unsaturated carboxylic acids (e.g., maleyl chloride), imide compounds thereof (e.g., maleimide) and ester compounds thereof (e.g., monomethyl maleate, dimethyl maleate and glycidyl maleate).

The above-mentioned graft modifiers may be used singly or in combination.

Of the graft modifiers, the unsaturated carboxylic anhydrides are preferably used, and among these, maleic anhydride or nadic anhydride is particularly preferred.

For graft-modifying the unmodified α-olefin random elastic copolymer with the graft modifier, there are known a method of suspending or dissolving the unmodified α-olefin random elastic copolymer in a solvent and adding the graft modifier to the resulting suspension or solution to perform graft reaction (solution method) and a method of melting a mixture of the unmodified α-olefin random elastic copolymer and the graft modifier to perform graft reaction (melting method).

In the graft reaction of the above methods, the amount of the graft modifier is determined in consideration of reactivity of the graft modifier, and the amount thereof is generally in the range of 1 to 10 parts by weight based on 100 parts by weight of the unmodified α-olefin random elastic copolymer.

Through the above-mentioned graft reaction, there can be obtained a graft-modified α-olefin random elastic copolymer in which the graft modifier is graft polymerized in an amount of 0.01 to 10 parts by weight, preferably 0.05 to 5 parts by weight, per 100 parts by weight of the unreacted α-olefin random elastic copolymer.

In the graft reaction, a radical initiator is preferably used to enhance the graft efficiency. Examples of the radical initiator used herein are conventionally known radical initiators such as organic peroxides, organic peresters and azo compounds. In the case of using the radical initiator, the amount thereof is generally in the range of 0.01 to 20 parts by weight per 100 parts by weight of the unmodified α-olefin random elastic copolymer.

By the use of a graft-modified ethylene/propylene random copolymer rubber or a graft-modified ethylene/α-olefin random copolymer, each having an ethylene content of 35 to 50% by mol and being substantially non-crystalline, among from the above-described graft-modified α-olefin random elastic copolymers (B-1), a molded product having high toughness can be obtained.

The graft-modified product of a cycloolefin ring opening polymer or the graft-modified product of a cycloolefin copolymer (B-2) used as the modified polymer (B) in the invention is a graft-modified product of a ring opening polymer of specific cycloolefin or a modified polymer obtained by graft modifying a cycloolefin copolymer which is an addition polymer of the cycloolefin and ethylene. Hereinafter, both of these modified products (B-2) are also referred to inclusively as "graft-modified cycloolefin polymer". This graft-modified cycloolefin polymer used as the [B] component in the invention is non-crystalline, and a composition containing this polymer has such excellent properties that the composition is more reduced in warping while keeping high rigidity, as compared with a polyamide composition containing other modified polyolefin.

The cycloolefin used herein is a compound represented by the following formula [III] or [IV].

First, cycloolefin represented by the following formula [III] is described below.

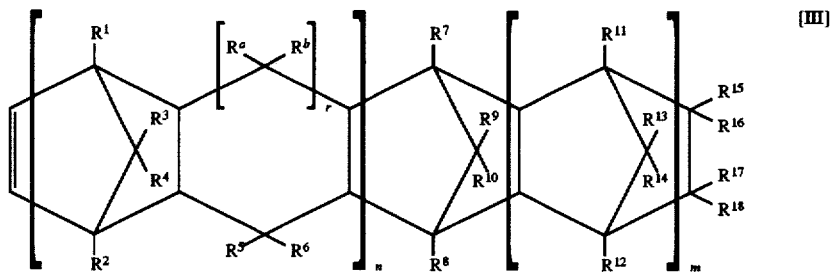

In the above formula [III], n is 0 or 1, m is 0 or a positive integer, and r is 0 or 1. When r is 1, a ring represented by using r is a 6-member ring, and when r is 0, the ring is a 5-member ring.

$R^1$ to $R^{18}$, $R^a$ and $R^b$ are each independently a hydrogen atom, a halogen atom or a hydrocarbon group.

Examples of the halogen atom include fluorine atom, chlorine atom, bromine atom and iodine atom. Examples of the hydrocarbon group include alkyl group generally having 1 to 20 carbon atoms and cycloalkyl group generally having 3 to 15 carbon atoms. Concrete examples of the alkyl group include methyl group, ethyl group, propyl group, isopropyl group, amyl group, hexyl group, octyl group, decyl group, dodecyl group and octadecyl group. A concrete example of the cycloalkyl group is cyclohexyl group.

Further, $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ in the above formula [III] may be linked together (in cooperation with each other) to form a monocyclic or polycyclic structure, and thus formed monocyclic or polycyclic structure may have a double bond.

Examples of the monocyclic or polycyclic structure are given below.

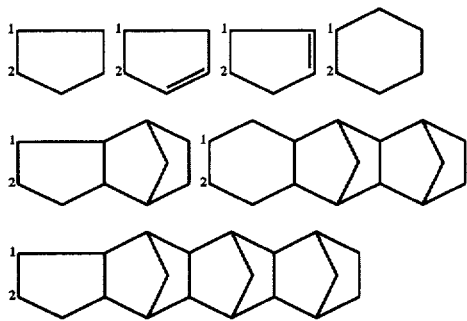

In the above-exemplified structures, carbon atoms attached with numbers of 1 and 2 are carbon atoms of alicyclic structure to which groups indicated by $R^{15}$ ($R^{16}$) and $R^{17}$ ($R^{18}$) in the formula [III] are bonded.

Furthermore, $R^{15}$ and $R^{16}$, or $R^{17}$ and $R^{18}$ may together form an alkylidene group. This alkylidene group is generally an alkylidene group of 2 to 20 carbon atoms, and concrete examples of such alkylidene group include ethylidene group, propylidene group and isopropylidene group.

Next, cycloolefin represented by the following formula [IV] is described below.

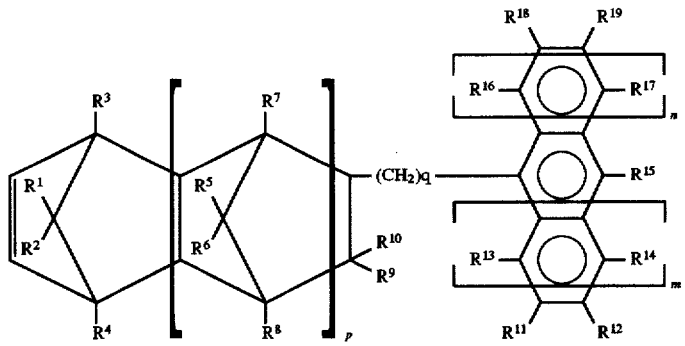

In the above formula [IV], p is 0 or a positive integer, preferably 0 or an integer of 1 to 3; each of m and n is 0, 1 or 2; and q is 0 or a positive integer, preferably 0 or 1.

$R^1$ to $R^{19}$ are each independently a hydrogen atom, a halogen atom or a hydrocarbon group.

Examples of the halogen atom include fluorine atom, chlorine atom, bromine atom and iodine atom. Examples of the hydrocarbon group include alkyl group of 1 to 10 carbon atoms, cycloalkyl group of 5 to 15 carbon atoms, aromatic group of 6 to 12 carbon atoms and alkoxy group of 1 to 10 carbon atoms. Concrete examples of the alkyl group include methyl group, ethyl group, isopropyl group, isobutyl group, n-amyl group, neopentyl group, n-hexyl group, n-octyl group, n-decyl group and 2-ethylhexyl group. Concrete examples of the cycloalkyl group include cyclohexyl group, methylcyclohexyl group and ethylcyclohexyl group. Concrete examples of the aromatic group include aryl group and aralkyl group, and there can be mentioned more concretely phenyl group, tolyl group, naphthyl group, benzyl group, phenylethyl group and biphenyl group. These groups may have lower alkyl group. Concrete examples of the alkoxy group include methoxy group, ethoxy group and propoxy group. These groups may be substituted with halogen atoms.

In the above formula [IV], a carbon atom to which $R^9$ and $R^{10}$ are bonded may be linked to a carbon atom to which $R^{13}$ is bonded or may be linked to a carbon atom to which $R^{11}$ is bonded, directly or by way of an alkylene group having 1 to 3 carbon atoms. When the above two carbon atoms are linked by way of the alkylene group, it is preferred that $R^9$ and $R^{13}$, or $R^{10}$ and $R^{11}$ form together (in cooperation with each other) any alkyl group of methylene group (—$CH_2$—), ethylene group (—$CH_2CH_2$—) and propylene group (—$CH_2CH_2CH_2$—)

Further, when each of n and m is 0, $R^{15}$ and $R^{12}$, or $R^{15}$ and $R^{19}$ may be linked to each other to form a monocyclic or polycyclic aromatic ring. Preferred examples in this case are the following groups where $R^{15}$ and $R^{12}$ further form an aromatic ring when each of n and m is 0.

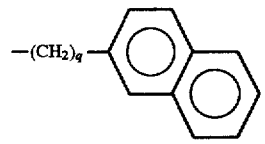

-continued

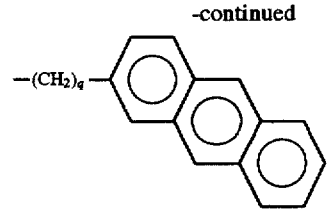

–(CH$_2$)$_q$– 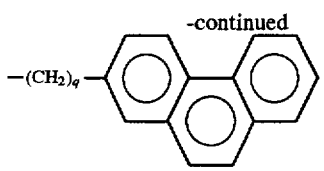

In the above formulas, q has the same meaning as defined in the aforementioned formula [IV].

The cycloolefin represented by the aforementioned formula [III] or [IV] can be prepared by condensing cyclopentadienes with olefins or cycloolefins corresponding to the cyclopentadienes through Diels-Alder reaction.

As the cycloolefin represented by the formula [III] or [IV] employable in the invention, there can be concretely mentioned the following compounds and derivatives of those compounds.

Bicyclo[2.2.1]hepto-2-ene derivative,
Tricyclo[4.3.0.1$^{2,5}$]-3-decene derivative,
Tricyclo[4.3.0.1$^{2,5}$]-3-undecene derivative,
Tetracyclo[4.4.0.1$^{2,5}$.1$^{7,10}$]-3-dodecene derivative,
Pentacyclo[6.6.1.1$^{3,6}$.0$^{2,7}$.0$^{9,14}$]-4-hexadecene derivative,
Pentacyclo[6.5.1.1$^{3,6}$.0$^{2,7}$.0$^{9,13}$]-4-hexadecene derivative,
Pentacyclo[7.4.0.1$^{2,5}$.1$^{9,12}$.0$^{8,13}$]-3-pentadecene derivative,
Pentacyclopentadecadiene derivative,
Pentacyclo[8.4.0.1$^{2,5}$.1$^{9,12}$.0$^{8,13}$]-3-pentadecene derivative,
Hexacyclo[6.6.1.1$^{3,6}$.1$^{10,13}$.0$^{2,7}$.0$^{9,14}$]-4-heptadecene derivative,
Heptacyclo[8.7.0.1$^{3,6}$.1$^{10,17}$.1$^{12,15}$.0$^{2,7}$.0$^{11,16}$]-4-eicosene derivative,
Heptacyclo[8.7.0.1$^{3,6}$.1$^{10,17}$.1$^{12,17}$.0$^{2,7}$.0$^{11,16}$]-5-eicosene derivative,
Heptacyclo[8.8.0.1$^{4,7}$.1$^{11,18}$.1$^{13,16}$.0$^{3,8}$.0$^{12,17}$]-5-heneicosene derivative,
Heptacyclo[8.8.0.1$^{2,9}$.1$^{4,7}$.1$^{11,18}$.0$^{3,8}$.0$^{12,17}$]-5-heneicosene derivative,
Octacyclo [8.8.0.1$^{2,9}$.1$^{4,7}$.1$^{11,18}$.1$^{13,16}$.0$^{3,8}$.0$^{2,17}$]-5-docosene derivative,
Nonacyclo [10.9.1.1$^{4,7}$.1$^{13,20}$.1$^{15,18}$.0$^{3,8}$.0$^{2,10}$.0$^{12,21}$.0$^{14,19}$]-5-pentacosene derivative,
Nonacyclo [10.10.1.1$^{5,8}$.1$^{14,21}$.1$^{16,19}$.0$^{2,11}$.0$^{4,9}$.0$^{13,22}$.0$^{15,20}$]-5-hexacosene derivative,
1,4-methano-1,4,4a,9α-tetrahydrofluorene derivative,
1,4-methano-1,4,4a,5,10,10α-hexahydroanthracene derivative, and Cyclopentadiene-acenaphthylene adduct.

Concrete examples of the cycloolefin compounds represented by the above formula [III] or [IV] are given below. The bicyclo[2.2.1]hept-2-ene derivatives such as

| | |
|---|---|
| | Bicyclo[2.2.1]hept-2-ene |
| –CH$_3$ | 6-Methylbicyclo[2.2.1]hept-2-ene |
| –CH$_3$ –CH$_3$ | 5,6-Dimethylbicyclo[2.2.1]-hept-2-ene |
| CH$_3$ | 1-Methylbicyclo[2.2.1]hept-2-ene |
| –C$_2$H$_5$ | 6-Ethylbicyclo[2.2.1]hept-2-ene |
| –nC$_4$H$_9$ | 6-n-Butylbicyclo[2.2.1]hept-2-ene |
| –iC$_4$H$_9$ | 6-Isobutylbicyclo[2.2.1]hept-2-ene |
| CH$_3$ | 7-Methylbicyclo[2.2.1]hept-2-ene; | the tetracyclo[4.4.0.1$^{2,5}$.1$^{7,10}$]-3- dodecene derivatives such as

| | |
|---|---|
| | Tetracyclo[4.4.0.1$^{2,5}$.1$^{7,10}$]-3-dodecene |
| CH$_3$ | 8-Methyltetracyclo [4.4.0.1$^{2,5}$.1$^{7,10}$]-3-dodecene |
| C$_2$H$_5$ | 8-Ethyltetracyclo [4.4.0.1$^{2,5}$.1$^{7,10}$]-3-dodecene |

-continued

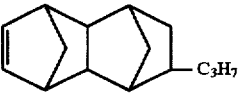 8-Propyltetracyclo[4.4.0.1$^{2,5}$.1$^{7,10}$]-3-dodecene

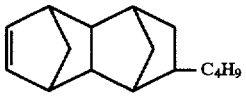 8-Butyltetracyclo[4.4.0.1$^{2,5}$.1$^{7,10}$]-3-dodecene

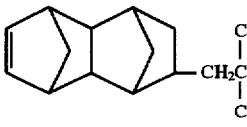 8-Isobutyltetracyclo-[4.4.0.1$^{2,5}$.1$^{7,10}$]-3-dodecene

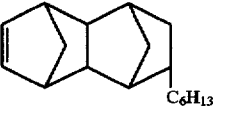 8-Hexyltetracyclo[4.4.0.1$^{2,5}$.1$^{7,10}$]-3-dodecene

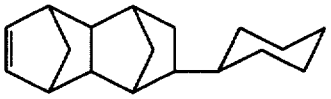 8-Cyclohexyltetracyclo-[4.4.0.1$^{2,5}$.1$^{7,10}$]-3-dodecene

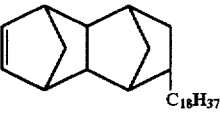 8-Stearyltetracyclo-[4.4.0.1$^{2,5}$.1$^{7,10}$]-3-dodecene

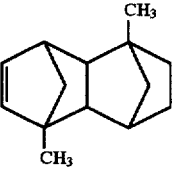 5,10-Dimethyltetracyclo-[4.4.0.1$^{2,5}$.1$^{7,10}$]-3-dodecene

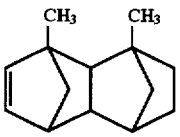 2,10-Dimethyltetracyclo-[4.4.0.1$^{2,5}$.1$^{7,10}$]-3-dodecene

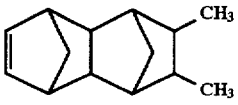 8,9-Dimethyltetracyclo-[4.4.0.1$^{2,5}$.1$^{7,10}$]-3-dodecene

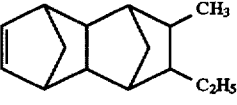 8-Methyl-9-ethyltetracyclo-[4.4.0.1$^{2,5}$.1$^{7,10}$]-3-dodecene

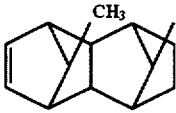 11,12-Dimethyltetracyclo-[4.4.0.1$^{2,5}$.1$^{7,10}$]-3-dodecene

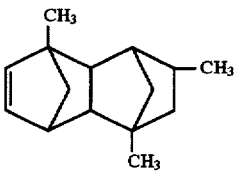 2,7,9-Trimethyltetracyclo-[4.4.0.1$^{2,5}$.1$^{7,10}$]-3-dodecene

| Structure | Name |
|---|---|
| | 9-Ethyl-2,7-dimethyltetracyclo-[4.4.0.1$^{2,5}$.1$^{7,10}$]-3-dodecene |
| | 9-Isobutyl-2,7-dimethyltetracyclo-[4.4.0.1$^{2,5}$.1$^{7,10}$]-3-dodecene |
| | 9,11,12-Trimethyltetracyclo-[4.4.0.1$^{2,5}$.1$^{7,10}$]-3-dodecene |
| | 9-Ethyl-11,12-dimethyltetracyclo-[4.4.0.1$^{2,5}$.1$^{7,10}$]-3-dodecene |
| | 9-Isobutyl-11,12-dimethyltetracyclo-[4.4.0.1$^{2,5}$.1$^{7,10}$]-3-dodecene |
| | 5,8,9,10-Tetramethyltetracyclo-[4.4.0.1$^{2,5}$.1$^{7,10}$]-3-dodecene |
| | 8-Ethylidenetetracyclo-[4.4.0.1$^{2,5}$.1$^{7,10}$]-3-dodecene |
| | 8-Ethylidene-9-methyltetracyclo-[4.4.0.1$^{2,5}$.1$^{7,10}$]-3-dodecene |
| | 8-Ethylidene-9-ethyltetracyclo-[4.4.0.1$^{2,5}$.1$^{7,10}$]-3-dodecene |
| | 8-Ethylidene-9-isopropyltetracyclo-[4.4.0.1$^{2,5}$.1$^{7,10}$]-3-dodecene |
| | 8-Ethylidene-9-butyltetracyclo-[4.4.0.1$^{2,5}$.1$^{7,10}$]-3-dodecene |
| | 8-n-Propylidenetetracyclo-[4.4.0.1$^{2,5}$.1$^{7,10}$]-3-dodecene |

-continued

| Structure | Name |
|---|---|
| (bicyclic structure with CH₃ and =CHCH₂CH₃ substituents) | 8-n-Propylidene-9-methyltetracyclo-[4.4.0.1²·⁵.1⁷·¹⁰]-3-dodecene |
| (bicyclic structure with C₂H₅ and =CHCH₂CH₃ substituents) | 8-n-Propylidene-9-ethyltetracyclo-[4.4.0.1²·⁵.1⁷·¹⁰]-3-dodecene |
| (bicyclic structure with CH(CH₃)₂ and —CHCH₂CH₃ substituents) | 8-n-Propylidene-9-isopropyltetracyclo[4.4.0.1²·⁵.1⁷·¹⁰]-3-dodecene |
| (bicyclic structure with C₄H₉ and =CHCH₂CH₃ substituents) | 8-n-Propylidene-9-butyltetracyclo-[4.4.0.1²·⁵.1⁷·¹⁰]-3-dodecene |
| (bicyclic structure with =C(CH₃)CH₃ substituent) | 8-Isopropylidenetetracyclo-[4.4.0.1²·⁵.1⁷·¹⁰]-3-dodecene |
| (bicyclic structure with CH₃ and =C(CH₃)CH₃ substituents) | 8-Isopropylidene-9-methyltetracyclo-[4.4.0.1²·⁵.1⁷·¹⁰]-3-dodecene |
| (bicyclic structure with C₂H₅ and =C(CH₃)CH₃ substituents) | 8-Isopropylidene-9-ethyltetracyclo-[4.4.0.1²·⁵.1⁷·¹⁰]-3-dodecene |
| (bicyclic structure with CH(CH₃)₂ and =C(CH₃)CH₃ substituents) | 8-Isopropylidene-9-isopropyltetracyclo[4.4.0.1²·⁵.1⁷·¹⁰]-3-dodecene |
| (bicyclic structure with C₄H₉ and =C(CH₃)CH₃ substituents) | 8-Isopropylidene-9-butyltetracyclo-[4.4.0.1²·⁵.1⁷·¹⁰]-3-dodecene; |
| (bicyclic structure with Cl substituent) | 8-Chlorotetracyclo[4.4.0.1²·⁵.1⁷·¹⁰]-3-dodecene |
| (bicyclic structure with Br substituent) | 8-Bromotetracyclo[4.4.0.1²·⁵.1⁷·¹⁰]-3-dodecene |
| (bicyclic structure with F substituent) | 8-Fluorotetracyclo[4.4.0.1²·⁵.1⁷·¹⁰]-3-dodecene |
| (bicyclic structure with two Cl substituents) | 8,9-Dichlorotetracyclo-[4.4.0.1²·⁵.1⁷·¹⁰]-3-dodecene | the hexacyclo[6.6.1.1$^{3,6}$.1$^{10,13}$.0$^{2,7}$.0$^{9,14}$]-4-heptadecene derivatives such as
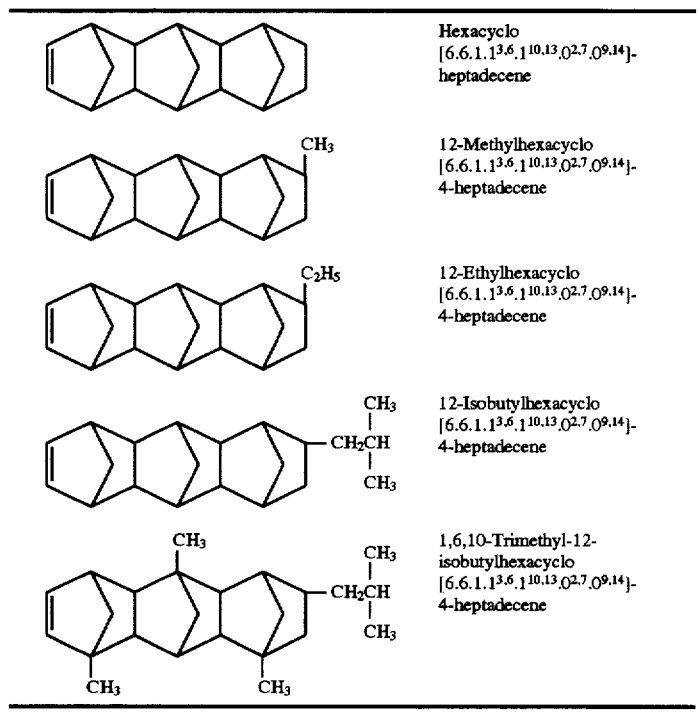
the octacyclo[8.8.0.1$^{2,9}$.1$^{4,7}$.1$^{11,18}$.1$^{13,16}$.0$^{3,8}$.0$^{12,17}$]-5-docosene derivatives such as
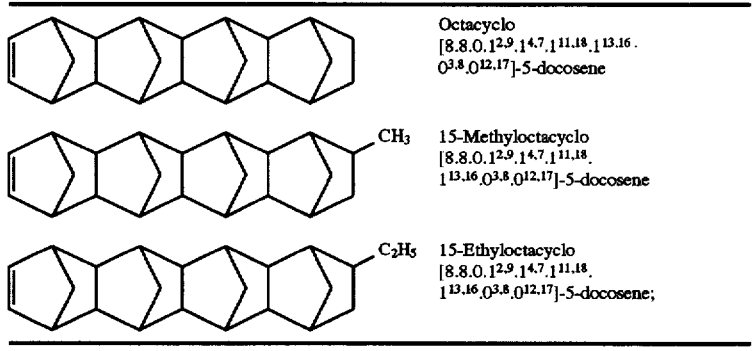
the pentacyclo[6,6,1,1$^{3,6}$,0$^{2,7}$,0$^{9,14}$]-4-hexadecene derivatives such as
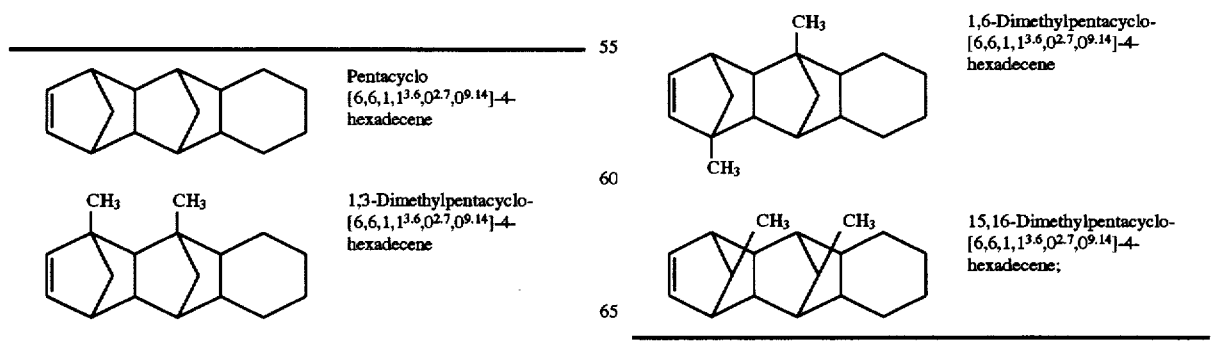

the heptacyclo-5-eicosene derivatives or heptacyclo-5-heneicosene derivatives such as

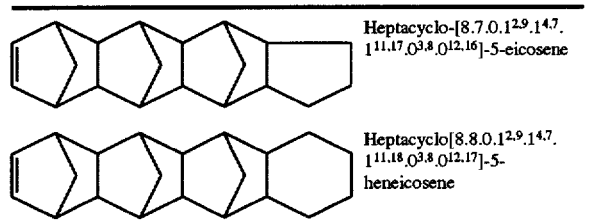

the tricyclo[4.4.0.1$^{2,5}$]-3-decene derivatives such as

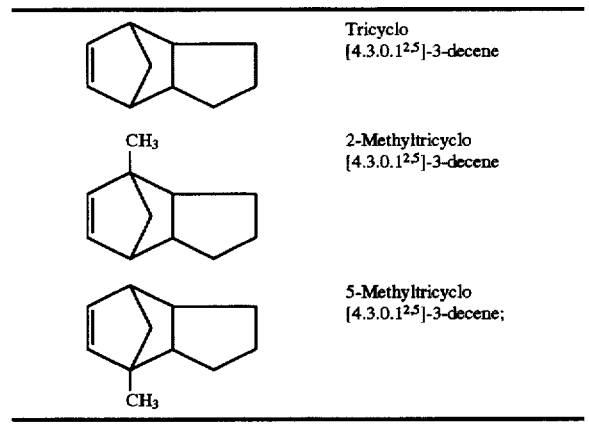

the tricyclo[4.4.0.1$^{2,5}$]-3-undecene derivatives such as

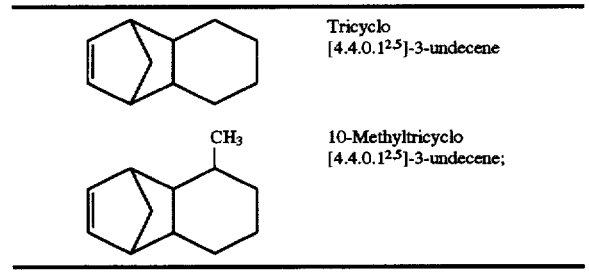

the pentacyclo[6.5.1.1$^{3,6}$.0$^{2,7}$.0$^{9,13}$]-4-pentadecene derivatives such as

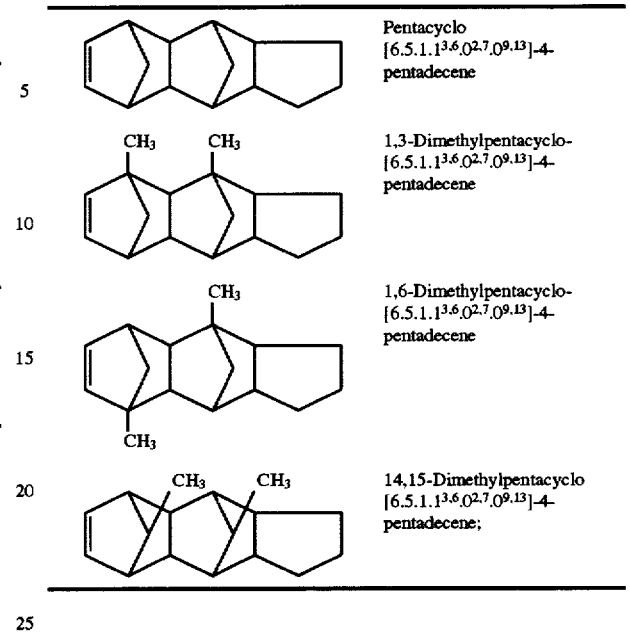

the diene compounds such as

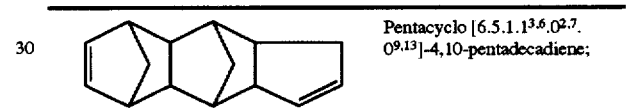

the pentacyclo[7.4.0.1$^{2,5}$.1$^{9,12}$.0$^{8,13}$]-3-pentadecene derivatives such as

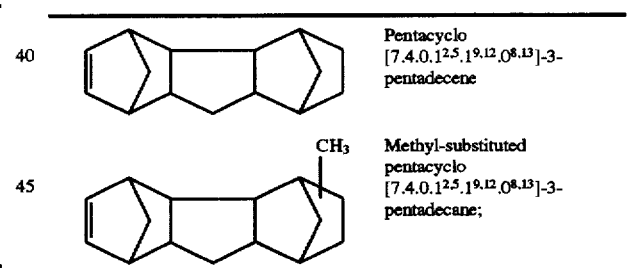

the heptacyclo[8.7.0.1$^{3,6}$.1$^{10,17}$.1$^{12,15}$.0$^{2,7}$.0$^{11,16}$]-4-eicosene derivatives such as

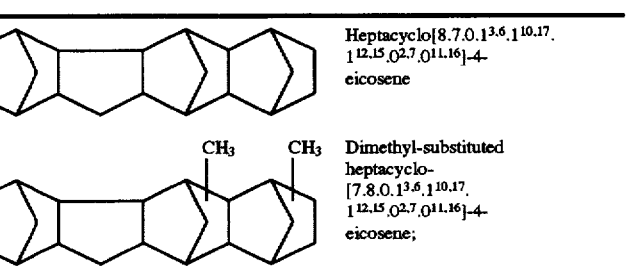

the nonacyclo[10.9.1.1$^{4,7}$.1$^{13,20}$.1$^{15,18}$.0$^{2,10}$.0$^{12,21}$.0$^{14,19}$]-5-pentacosene derivatives such as
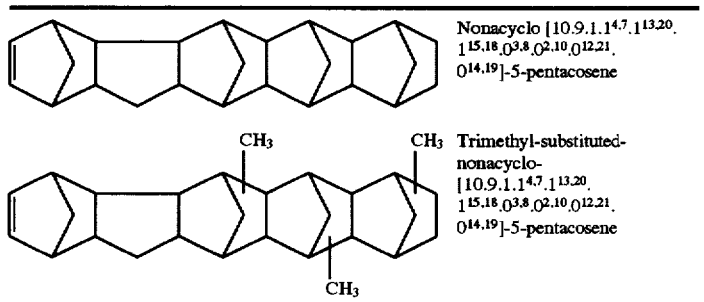
The Pentacyclo[8.4.0.1$^{2,5}$.1$^{9,12}$.0$^{8,13}$]-3-hexadecene derivatives such as
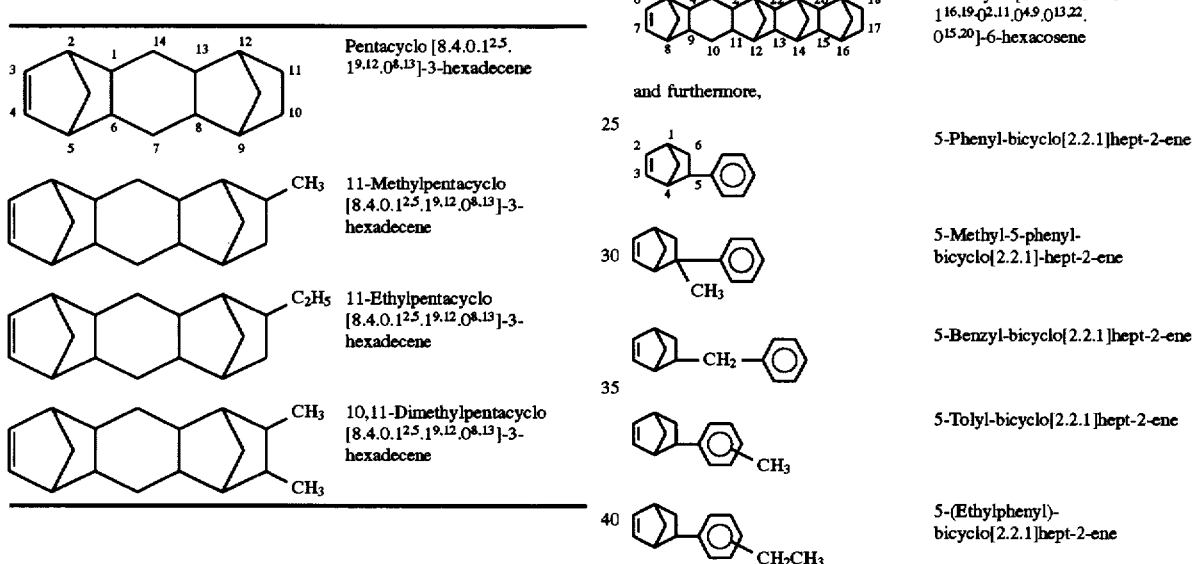
The heptacyclo [8.8.0.1$^{4,7}$.1$^{11,18}$.1$^{13,16}$.0$^{3,8}$.0$^{12,17}$]-5-heneicosene derivatives such as
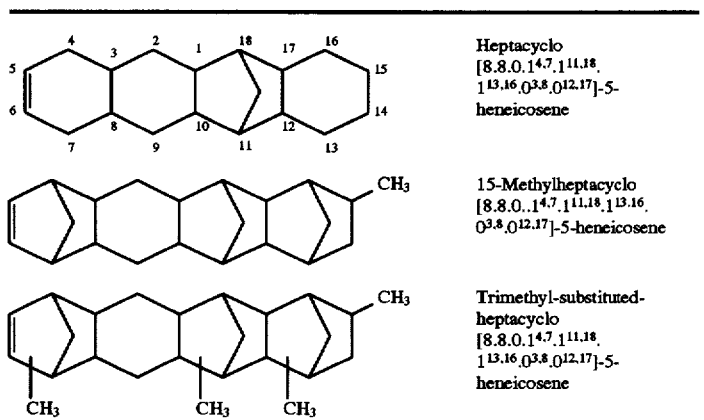
The nonacyclo [10.10.1.1$^{5,8}$.1$^{14,21}$.1$^{16,19}$.0$^{2,11}$.0$^{4,9}$.0$^{13,22}$.0$^{15,20}$]-6-hexacosene derivatives such as

| Structure | Name |
|---|---|
| 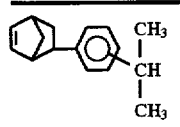 | 5-(Isopropylphenyl)-bicyclo[2.2.1]-hept-2-ene |
| 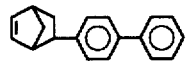 | 5-(Biphenyl)-bicyclo[2.2.1]hept-2-ene |
| 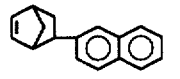 | 5-(β-Naphthyl)-bicyclo[2.2.1]hept-2-ene |
| 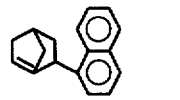 | 5-(α-Naphthyl)-bicyclo[2.2.1]hept-2-ene |
|  | 5-(Anthracenyl)-bicyclo[2.2.1]hept-2-ene |
| 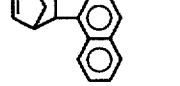 | 5,6-Diphenyl-bicyclo[2.2.1]hept-2-ene |
| 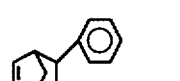 | Cyclopentadiene-acenaphthylene adducts |
| 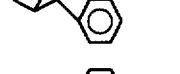 | 1,4-Methano-1,4-4a,9a-tetrahydro-fluorene |
| 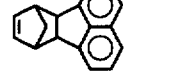 | 1,4-Methano-1,4,4a,5,10,10a-hexahydroanthracene |
| 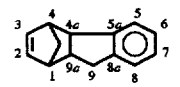 | 8-Phenyltetracyclo[4.4.0.1$^{2,5}$.1$^{7,10}$]-3-dodecene |
| 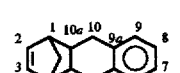 | 8-Methyl-8-phenyl-tetracyclo[4.4.0.1$^{2,5}$.1$^{7,10}$]-3-dodecene |
| 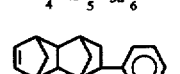 | 8-Benzyl-tetracyclo[4.4.0.1$^{2,5}$.1$^{7,10}$]-3-dodecene |
| 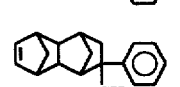 | 8-Tolyl-tetracyclo[4.4.0.1$^{2,5}$.1$^{7,10}$]-3-dodecene |
| 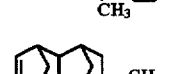 | 8-(Ethylphenyl)-tetracyclo[4.4.0.1$^{2,5}$.1$^{7,10}$]-3-dodecene |
| 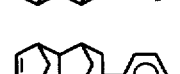 | 8-(Isopropylphenyl)tetracyclo[4.4.0.1$^{2,5}$.1$^{7,10}$]-3-dodecene |
| 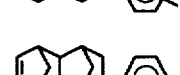 | 8,9-Diphenyl-tetracyclo[4.4.0.1$^{2,5}$.1$^{7,10}$]-3-dodecene |
| 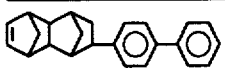 | 8-(Biphenyl)-tetracyclo[4.4.0.1$^{2,5}$.1$^{7,10}$]-3-dodecene |
| 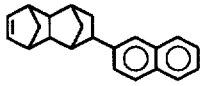 | 8-(β-Naphthyl)-tetracyclo[4.4.0.1$^{2,5}$.1$^{7,10}$]-3-dodecene |
| 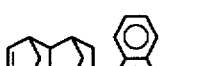 | 8-(α-Naphthyl)-tetracyclo[4.4.0.1$^{2,5}$.1$^{7,10}$]-3-dodecene |
| 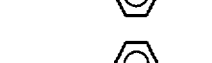 | 8-(Anthracenyl)-tetracyclo[4.4.0.1$^{2,5}$.1$^{7,10}$]-3-dodecene |
|  | Compound of cyclopentadiene-acenaphthylene adducts with cyclopentadiene further added |
|  | 11,12-Benzo-pentacyclo[6.5.1.1$^{3,6}$.0$^{2,7}$.0$^{9,13}$]-4-pentadecene |
| 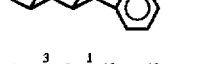 | 11,12-Benzo-pentacyclo[6.5.1.1$^{3,6}$.0$^{2,7}$.0$^{9,14}$]-4-hexadecene |
| 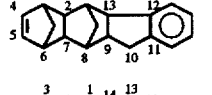 | 11-Phenyl-hexacyclo[6.6.1.1$^{3,6}$.0$^{2,7}$.0$^{9,14}$]-4-heptadecene |
| 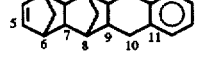 | 14,15-Benzo-heptacyclo[8.7.0.1$^{2,9}$.1$^{4,7}$.1$^{11,17}$.0$^{3,8}$.0$^{12,16}$]-5-eicosene |

Of the cycloolefins represented by the formulas [III] and [IV], the cycloolefin represented by the formula [III] is preferably used in the invention. The cycloolefin represented by the formula [III] is easily available, and a polyamide resin composition containing a graft-modified product having repeating units derived from this cycloolefin is excellent in moldability.

The above-mentioned cycloolefins may be used singly or in combination.

The cycloolefin copolymer used in the invention is a copolymer of ethylene and the above-mentioned cycloolefin. A molar ratio between repeating units derived from ethylene and repeating units derived from the cycloolefin is appropriately determined in consideration of properties of the resultant cycloolefin copolymer, and the molar ratio therebetween is generally in the range of 40:60 to 80:20, preferably 50:50 to 75:25.

The cycloolefin copolymer used in the invention may be a copolymer of ethylene, the cycloolefin and other olefin compound than ethylene.

Examples of the olefin compound copolymerizable with ethylene and the cycloolefin represented by the above formula include:

α-olefins of 3 to 20 carbon atoms such as propylene, 1-butene, 4-methyl-1-pentene, 1-hexene, 1-octene, 1-decene, 1-dodecene, 1-tetradecene, 1-hexadecene, 1-octadecene and 1-eicosene;

cycloolefins such as cyclopentene, cyclohexene, 3-methylcyclohexene, cyclooctene and 3a,5,6,7a-tetrahydro-4,7-methano-1H-indene;

non-conjugated dienes such as 1,4-hexadiene, 4-methyl-1,4-hexadiene, 5-methyl-1,4-hexadiene, 1,7-octadiene, dicyclopentadiene, 5-ethylidene-2-norbornene and 5-vinyl-2-norbornene; and norbornenes such as 2-norbornene, 5-methyl-2-norbornene, 5-ethyl-2-norbornene, 5-isopropyl-2-norbornene, 5-n-butyl-2-norbornene, 5-1-butyl-2-norbornene, 5,6-dimethyl-2-norbornene, 5-chloro-2-norbornene, 2-fluoro-2-norbornene and 5,6-dichloro-2-norbornene.

The reaction of ethylene with the cycloolefin represented by the formula [III] or [IV] is generally carried out in a hydrocarbon solvent.

Examples of the hydrocarbon solvent used herein include aliphatic hydrocarbons such as hexane, heptane, octane and kerosine; alicyclic hydrocarbons such as cyclohexane and methylcyclohexane; and aromatic hydrocarbons such as benzene, toluene and xylene. Also employable as a reaction solvent are compounds which are polymerizable unsaturated monomers used for preparing the cycloolefin copolymer and are liquid at a reaction temperature. The above-mentioned solvents may be used singly or in combination.

In the reaction of ethylene with the cycloolefin represented by the formula [III] or [IV], a catalyst formed from a vanadium compound which is soluble in a hydrocarbon solvent used as a reaction solvent and an organoaluminum compound or other catalyst is employed.

The repeating unit derived from the cycloolefin represented by the formula [III] is thought to have a structure represented by the following formula [III-A] when this cycloolefin is reacted with ethylene.

In the above formula [IV-A], n, m, p, q and $R^1$ to $R^{19}$ have the same meanings as defined in the aforementioned formula [IV].

In the cycloolefin copolymer, the repeating units represented by the above formula [III-A] or [IV-A] derived from the cycloolefin represented by [III] or [IV] are linked to the repeating units derived from ethylene at random. This can be confirmed from the results obtained by measuring $^{13}C$-NMR spectrum of the cycloolefin copolymer.

The cycloolefin type resin prepared as above may be purified if necessary by subjecting it to a deashing procedure, a filtering procedure, a precipitation procedure, etc. The deashing procedure is carried out, for example, by bringing the reaction solution into contact with an aqueous solution of alkali to remove a residual catalyst remaining in the resin. The precipitation procedure is carried out, for example, by introducing the reaction solution into a poor solvent to precipitate the resin dissolved in the reaction solvent.

This cycloolefin copolymer has an iodine value of usually not more than 5, preferably not more than 1, and has an intrinsic viscosity $[\eta]$, as measured in decalin at 135° C., of usually 0.01 to 20 dl/g, preferably 0.05 to 10 dl/g, more preferably 0.08 to 8 dl/g.

The cycloolefin copolymer generally is non-crystalline or low-crystalline, preferably non-crystalline, and accordingly, this cycloolefin copolymer has high transparency. Further, when the cycloolefin copolymer is measured in the crystallinity by X rays, the crystallinity is usually not more than 5%, and in most cases, 0%. Therefore, even when tried to be measured in the melting point using a differential scanning calorimeter (DSC), most of the cycloolefin copolymers are unmeasurable.

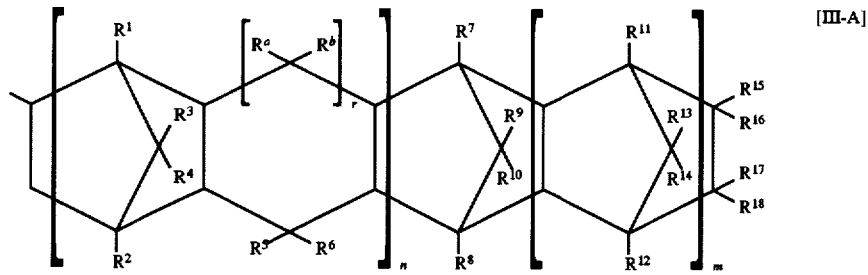

[III-A]

In the above formula [III-A], m, n, r, $R^1$ to $R^{18}$, $R^a$ and $R^b$ have the same meanings as defined in the aforementioned formula [III].

On the other hand, the repeating unit derived from the cycloolefin represented by the formula [IV] is thought to have a structure represented by the following formula [IV-A] when this cycloolefin is reacted with ethylene.

The cycloolefin copolymer as mentioned above has other feature that a glass transition temperature (Tg) and a softening temperature (TMA) thereof are high. The glass transition temperature (Tg) of the cycloolefin copolymer is usually not higher than 230° C., preferably in the range of 50° to 230° C., and in most cases, it is in the range of 100° to 200° C. In the invention, a cycloolefin copolymer having

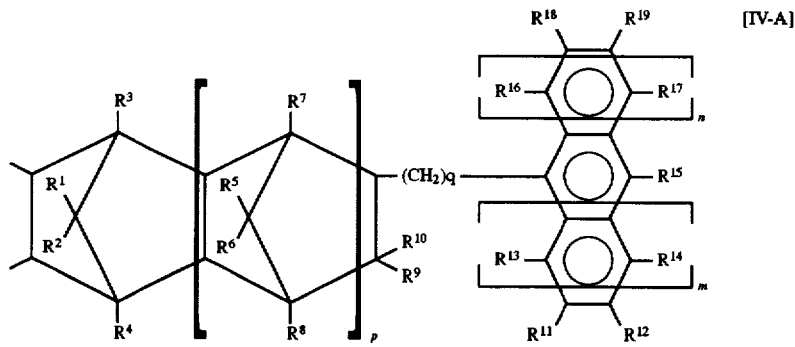

[IV-A]

a softening temperature of usually 70° to 180° C., preferably 90° to 180° C., is employed. A thermal decomposition temperature of the cycloolefin copolymer is usually in the range of 350° to 420° C., and in most cases, it is in the range of 370° to 400° C. The cycloolefin copolymer has, as its mechanical properties, a tensile modulus of usually $1 \times 10^4$ to $5 \times 10^4$ kg/cm$^2$ and a tensile strength of usually 300 to 1,500 kg/cm$^2$. A density of the copolymer is usually in the range of 0.86 to 1.10 g/cm$^3$, and in most cases, it is in the range of 0.88 to 1.08 g/cm$^3$.

The graft-modified cycloolefin copolymer (B-2) used as the modified polymer (B) in the invention is prepared by graft modifying the above-mentioned unmodified cycloolefin copolymer using unsaturated carboxylic acids, unsaturated carboxylic anhydrides or unsaturated carboxylic acid derivatives. Examples of the unsaturated carboxylic acids, the unsaturated carboxylic anhydrides and the unsaturated carboxylic acid derivatives used herein are the aforementioned graft modifiers used for modifying the unmodified α-olefin random elastic copolymer. These graft modifiers may be used singly or in combination.

Of the graft modifiers, the unsaturated carboxylic anhydrides are preferably used, and among therefrom, maleic anhydride or nadic anhydride is particularly preferred.

For graft polymerization of the unmodified cycloolefin copolymer with the above-mentioned graft modifier, the same solution method or melting method as described for modifying the aforesaid α-olefin random elastic copolymer can be applied.

An amount of the graft modifier used for the graft reaction is determined in consideration of the reactivity of the graft modifier, and the amount thereof is usually in the range of 1 to 10 parts by weight per 100 parts by weight of the unmodified cycloolefin copolymer. In this graft reaction, radical initiators such as organic peroxides, organic peresters and azo compounds can be used, as described before.

Through the graft reaction, there can be obtained a graft-modified cycloolefin copolymer in which the graft modifier is graft polymerized in an amount of usually 0.01 to 10 parts by weight, preferably 0.05 to 5 parts by weight, per 100 parts by weight of the unreacted cycloolefin copolymer.

By the use of the radical initiator in the graft reaction, graft efficiency can be improved. Examples of the radical initiator employable herein are conventionally known radical initiators such as organic peroxides, organic peresters and azo compounds. The radical initiator is used generally in an amount of 0.01 to 20 parts by weight based on 100 parts by weight of the unmodified cycloolefin copolymer.

The graft-modified product has properties almost equal to those of the unmodified cycloolefin copolymer.

The graft-modified product of a ring opening polymer of cycloolefin (B-2) is a graft-modified product obtained by subjecting the cycloolefin represented by the above formula [III] or [IV] to ring opening (co)polymerization to prepare a cycloolefin ring opening polymer and causing the cycloolefin ring opening polymer to react with the graft modifier.

The cycloolefin ring opening polymer can be prepared, for example, by subjecting the cycloolefin represented by the formula [III] to ring opening (co)polymerization in the presence of a catalyst comprising a halide of metal such as ruthenium, rhodium, palladium, osmium, indium or platinum, nitride thereof or an acetylacetone compound thereof, and a reducing agent, or in the presence of a catalyst comprising a halide of metal such as titanium, palladium, zirconium or molybdenum or an acetylacetone compound, and organoaluminum.

In the cycloolefin ring opening copolymer, at least a part of the cycloolefin represented by the formula [III] is thought to have a structure represented by the following formula [III-B].

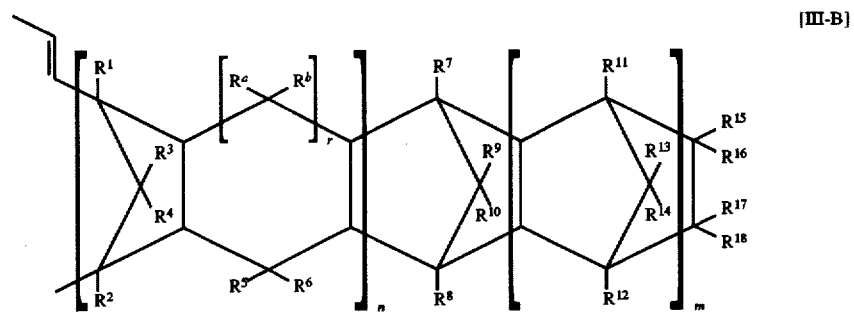

[III-B]

In the above formula [III-B], n, m, r, $R^1$ to $R^{18}$, $R^a$ and $R^b$ have the same meanings as defined in the aforesaid formula [III].

Further, in the cycloolefin ring opening polymer, at least a part of the cycloolefin represented by the formula [IV] is thought to have a structure represented by the following formula [IV-B].

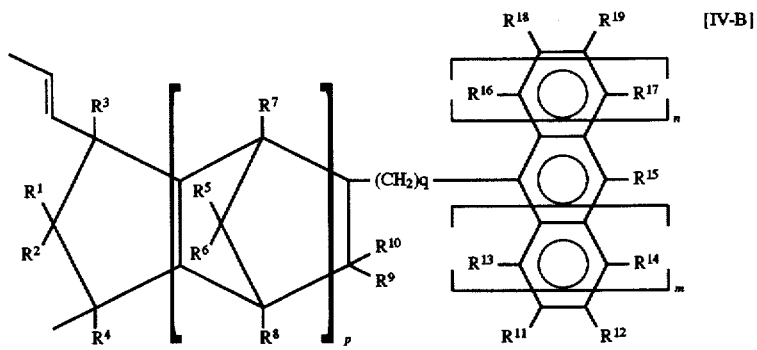

[IV-B]

In the above formula [IV-B], m, n, p, q and $R^1$ to $R^{19}$ have the same meanings as defined in the aforesaid formula [IV].

The cycloolefin ring opening polymer mentioned as above may be used by hydrogenating double bonds in its molecule.

The graft modified ring opening polymer (B-2) is prepared by graft modifying the above-mentioned unmodified ring opening polymer using unsaturated carboxylic acids, unsaturated carboxylic anhydrides or unsaturated carboxylic acid derivatives. Examples of the unsaturated carboxylic acids, the unsaturated carboxylic anhydrides and the unsaturated carboxylic acid derivatives used herein are the aforementioned graft modifiers used for modifying the unmodified α-olefin random elastic copolymer. These graft modifiers may be used singly or in combination. Of the graft modifiers, the unsaturated carboxylic anhydrides are preferably used, and among therefrom, maleic anhydride or nadic anhydride is particularly preferred.

For graft polymerization of the unmodified ring opening polymer with the above-mentioned graft modifier, the same solution method or melting method as described for modifying the aforesaid α-olefin random elastic copolymer can be applied.

An amount of the graft modifier used for the graft reaction is determined in consideration of the reactivity of the graft modifier, and the amount thereof is usually in the range of 1 to 10 parts by weight per 100 parts by weight of the unmodified ring opening polymer. In this graft reaction, radical initiators such as organic peroxides, organic peresters and azo compounds can be used, as described before.

Through the graft reaction, there can be obtained a graft-modified ring opening polymer in which the graft modifier is graft polymerized in an amount of usually 0.01 to 10 parts by weight, preferably 0.05 to 5 parts by weight, per 100 parts by weight of the unreacted ring opening polymer.

By the use of the radical initiator in the graft reaction, graft efficiency can be improved. Examples of the radical initiator employable herein are conventionally known radical initiators such as organic peroxides, organic peresters and azo compounds. The radical initiator is used generally in an amount of 0.01 to 20 parts by weight based on 100 parts by weight of the unmodified ring opening polymer.

The graft-modified ring opening polymer used in the invention has an intrinsic viscosity [η], as measured in decalin at 135° C., of usually 0.01 to 20 dl/g, preferably 0.05 to 10 dl/g, more preferably 0.08 to 8 dl/g.

This graft-modified ring opening polymer generally is non-crystalline or low-crystalline, preferably non-crystalline, and has high transparency. Further, when the graft-modified ring opening polymer is measured in the crystallinity by X rays, the crystallinity is usually not more than 5%, and in most cases, 0%. Therefore, even when tried to be measured in the melting point using a differential scanning calorimeter (DSC), most of the graft-modified ring opening polymers are unmeasurable.

Further, the graft-modified ring opening polymer has a glass transition temperature (Tg) of usually not higher than 230° C., preferably in the range of 50° to 23° C., and in most cases, it is in the range of 100° to 200° C. In the invention, a graft-modified ring opening polymer having a softening temperature of usually 70° to 180° C., preferably 90° to 180° C., is employed. A thermal decomposition temperature of the graft-modified ring opening polymer is usually in the range of 350° to 420° C., and in most cases, it is in the range of 370° to 400° C. Furthermore, the graft-modified ring opening polymer has a tensile modulus of usually $1 \times 10^4$ to $5 \times 10^4$ kg/cm² and a tensile strength of usually 300 to 1,500 kg/cm². A density of the ring opening polymer is usually in the range of 0.86 to 1.10 g/cm³, and in most cases, it is in the range of 0.88 to 1.08 g/cm³.

The graft-modified aromatic vinyl type hydrocarbon/conjugated diene copolymer or its hydrogenation product (B-3) used as the modified polymer (B) in the invention is a graft-modified product of a random or block copolymer of aromatic vinyl type hydrocarbon and a conjugated diene compound, or a graft-modified hydrogenation product of the random or block copolymer.

Concrete examples of the aromatic vinyl type hydrocarbon/conjugated diene copolymer or its hydrogenation product include styrene/butadiene block copolymer rubber, styrene/butadiene/styrene block copolymer rubber, styrene/isoprene block copolymer rubber, styrene/isoprene/styrene block copolymer rubber, hydrogenated styrene/butadiene/styrene block copolymer rubber, hydrogenated styrene/isoprene/styrene block copolymer rubber and styrene/butadiene random copolymer rubber.

In these copolymers, a molar ratio of repeating units derived from the aromatic vinyl type hydrocarbon to repeating units derived from the conjugated diene (aromatic vinyl type hydrocarbon/conjugated diene) is usually in the range of 10/90 to 70/30. The hydrogenated copolymer rubber is a copolymer obtained by hydrogenating a part of or all of double bonds remaining in the above-mentioned copolymer rubber.

An intrinsic viscosity [η] of the aromatic vinyl type hydrocarbon/conjugated diene copolymer or its hydrogenation product, as measured in decalin at 135° C., is generally in the range of 0.01 to 10 dl/g, preferably 0.08 to 7 dl/g, and a glass transition temperature (Tg) thereof is generally not higher than 0° C., preferably not higher than –10° C., particularly preferably not higher than –20° C. Further, a crystallinity thereof, as measured by means of X-ray diffractometry, is in the range of 0 to 10%, more preferably 0 to 7%, particularly preferably 0 to 5%.

The graft-modified aromatic vinyl type hydrocarbon/conjugated diene copolymer used in the invention is prepared by graft modifying the above-mentioned unmodified aromatic vinyl type hydrocarbon/conjugated diene copolymer using unsaturated carboxylic acids, unsaturated carboxylic anhydrides or unsaturated carboxylic acid derivatives in the similar manner to that for preparing the aforementioned graft-modified α-olefin random elastic copolymer (B-1).

Examples of the unsaturated carboxylic acids, the unsaturated carboxylic anhydrides and the unsaturated carboxylic acid derivatives used herein are compounds (graft modifiers) used for preparing the aforesaid graft-modified α-olefin random elastic copolymer. These graft modifiers may be used singly or in combination.

Of the graft modifiers, the unsaturated carboxylic anhydrides are preferably used, and among therefrom, maleic anhydride or nadic anhydride is particularly preferred.

For graft polymerization of the unmodified aromatic vinyl type hydrocarbon/conjugated diene copolymer or its hydrogenation product with the above-mentioned graft modifier, the same solution method or melting method as described for modifying the aforesaid α-olefin random elastic copolymer can be applied.

An amount of the graft modifier used for the graft reaction is determined in consideration of the reactivity of the graft modifier, and the amount thereof is usually in the range of 1 to 10 parts by weight per 100 parts by weight of the unmodified aromatic vinyl type hydrocarbon/conjugated diene copolymer or its hydrogenation product. In this graft reaction, radical initiators such as organic peroxides, organic peresters and azo compounds can be used, as described before.

Through the graft reaction, there can be obtained a graft-modified aromatic vinyl type hydrocarbon/conjugated diene copolymer or its hydrogenation product in which the graft modifier is graft polymerized in an amount of usually 0.01 to 10 parts by weight, preferably 0.05 to 5 parts by weight, per 100 parts by weight of the unreacted aromatic vinyl type hydrocarbon/conjugated diene copolymer or its hydrogenation product.

The graft-modified aromatic vinyl type hydrocarbon/conjugated diene copolymer or its hydrogenation product obtained as above is a low-crystalline to non-crystalline copolymer, and preferably it is substantially non-crystalline. That is, a graft-modified copolymer having a crystallinity, as measured by means of X-ray diffractometry, of not more than 10%, preferably not more than 7%, particularly preferably not more than 5%, is used in the invention. Most preferably, a graft-modified copolymer having a crystallinity of substantially 0% is used in the invention. Accordingly, most of the graft-modified aromatic vinyl type hydrocarbon/conjugated diene copolymers or their hydrogenation products show no definite melting point. Further, the graft-modified aromatic vinyl type hydrocarbon/conjugated diene copolymer or its hydrogenation product is soft because of its low crystallinity, and has a tensile modulus of usually not less than 0.1 kg/cm$^2$ but less than 20,000 kg/cm$^2$, preferably in the range of 1 to 15,000 kg/cm$^2$.

A melt index (measured at 190° C.) of the graft-modified aromatic vinyl type hydrocarbon/conjugated diene copolymer or its hydrogenation product is usually in the range of 0.1 to 30 g/10 min, preferably 1.0 to 20 g/10 min, particularly preferably 2.0 to 15 g/10 min.

A glass transition temperature (Tg) of the graft-modified aromatic vinyl type hydrocarbon/conjugated diene copolymer or its hydrogenation product is usually in the range of −150° to +50° C., preferably −80° to −20° C., and an intrinsic viscosity [η] thereof, as measured in decalin at 135° C., is usually in the range of 0.01 to 10 dl/g, preferably 1 to 5 dl/g. By the use of the above-described graft-modified aromatic vinyl type hydrocarbon/conjugated diene copolymer or its hydrogenation product, a molded product having high toughness can be obtained.

Each of the aforesaid graft-modified (α-olefin polymer (B-1) and the above-mentioned graft-modified aromatic vinyl type hydrocarbon/conjugated diene copolymer or its hydrogenation product (B-3) may be either a graft-modified product prepared by adjusting the amounts of the unmodified polymer and the modifier, etc. so as to obtain the desired modification rate, or a graft-modified product obtained by initially preparing a graft-modified product having high grafting rate and then diluting the product with an unmodified polymer so as to obtain the desired grafting rate.

The ethylene copolymer having a carboxyl group and a carboxylic metal salt group in the side chain (B-4) used as the modified polymer (B) in the invention has plural repeating units represented of the following formula [V]:

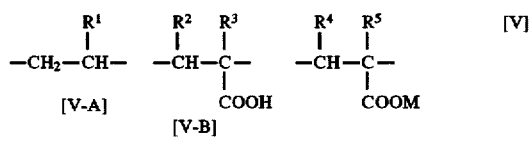

wherein R$^1$ to R$^5$ are each independently a hydrogen atom or an alkyl group of 1 to 5 carbon atoms, and M is a metallic ion of Group Ia, Ib, IIa, IIb or IIIa in the periodic table, concretely Na, K, Mg, Zn or the like.

The ethylene copolymer having a carboxyl group and a carboxylic metal salt group in the side chain (B-4) can be prepared, for example, by copolymerizing ethylene with (meth)acrylic acid and then introducing the above-mentioned metallic ion into a part of carboxyl groups of the resultant copolymer.

An example of the ethylene copolymer having a carboxyl group and a carboxylic metal salt group in the side chain (B-4) is an ionomer resin.

In the ethylene copolymer having a carboxyl group and a carboxylic metal salt group in the side chain, amounts of the repeating units represented by the above formulas [V-A], [V-B] and [V-C] may be appropriately determined. The repeating unit represented by the formula [V-B] is contained usually in an amount of 0.03 to 0.30 mol, and the repeating unit represented by the formula [V-C] is contained usually in an amount of 0.01 to 0.20 mol, based on 1 mol of the repeating unit represented by the formula [V-A].

In the present invention, the graft-modified α-olefin copolymer (B-1), the graft-modified product of a cycloolefin ring opening polymer or the graft-modified product of a cycloolefin copolymer (B-2), the graft-modified aromatic vinyl type hydrocarbon/conjugated diene copolymer or its hydrogenation product (B-3) and the ethylene copolymer containing a carboxyl group and a carboxylic metal salt in the side chain (B-4) may be used singly or in combination. For obtaining a molded product having excellent weather resistance, the hydrogenation product of the graft-modified aromatic vinyl type hydrocarbon/conjugated diene copolymer (B-3) is preferably used.

The modified polymer (B) may contain other polymers or copolymers than the above-mentioned ones, with the proviso that the properties of those resins are not marred.

In the thermoplastic resin composition of the invention, the modified polymer (B) is contained in an amount of 2 to 100 parts by weight, preferably 2 to 50 parts by weight, more preferably 5 to 20 parts by weight, most preferably 7 to 13 parts by weight, per 100 parts by weight of the polyamide (A) and/or the aromatic polyamide (A-1). When the modified polymer (B) is added in the above-mentioned amount, there can be obtained a composition capable for forming a molded product well balanced in various properties such as toughness, heat resistance and low water absorption properties.

By the use of the above-described polymer (B), a molded product can be efficiently inhibited in the reduction of toughness caused by heat deterioration.

The thermoplastic resin composition of the invention further contains a specific hindered phenol type antioxidant (C) and a specific sulfur type antioxidant (D).

The hindered phenol type antioxidant (C) used in the invention has a molecular weight of not less than 500, preferably not less than 540, more preferably not less than 600. Further, the hindered phenol type antioxidant (C) has a 10% weight loss temperature of not lower than 300° C., preferably not lower than 320° C., more preferably not lower than 350° C., in a thermogram measured in air.

The term "thermogram" used herein means a curve obtained by means of thermogravimetry (TGA) under the condition of a rate of temperature rise of 10° C./min using a thermal analysis device (model No. TG-DTA, produced by Rigaku Denki K.K.).

There are a variety of phenol type antioxidants other than the above-mentioned hindered phenol type antioxidant. In the case of using other phenol type antioxidant than the hindered phenol type antioxidant, however, heat stability of a molded product cannot be improved sufficiently.

Further, even if a hindered phenol type antioxidant having a molecular weight of less than 500 or having a 10% weight loss temperature of lower than 300° C. in the thermogram measured in air is used, the resultant composition loses the oxidation stabilizing function, because such hindered phenol type antioxidant is decomposed under heating during the preparation of the composition or the molding procedure of the composition. Moreover, since this decomposition of the antioxidant under heating causes foaming of the composition, a molded product formed from the composition tends to have defects.

Examples of the hindered phenol type antioxidant having the above-mentioned properties include:

n-octadecyl-3-(4'-hydroxy-3',5'-di-tert-butylphenyl) propionate (molecular weight: 530, TGA 10% weight loss temperature: 305° C.), 1,1,3-tris(2-methyl-4-hydroxy-5-tert-butylphenyl)butane (molecular weight: 544, TGA 10% weight loss temperature: 323° C.), 1,3,5-trimethyl-2,4,6-tris(3,5-di-tert-butyl-4-hydroxyphenyl)benzylbenzene (molecular weight: 744, TGA 10 % weight loss temperature: 338° C.), 1,3,5-tris(4-hydroxy-3,5-di-tert-butylbenzyl)-s-triazine-2,4,6-(1H,3H,5H)-trione (molecular weight: 783, TGA 10% weight loss temperature: 347° C.), ethylene glycol-bis[3,3-bis(3'-tert-butyl-4'-hydroxyphenyl)butyrate] (molecular weight: 794, TGA 10% weight loss temperature: 344° C.), tetrakis[methylene-3(3,5-di-tert-butyl-4-hydroxyphenyl) propionate]methane (molecular weight: 1,176, TGA 10% weight loss temperature: 355° C.), 3,9-bis[2-{3-(3-tert-butyl-4-hydroxy-5-methylphenyl) propionyloxy}-1,1-dimethylethyl]2,4,8,10-tetraoxaspiro[5,5]undecane (molecular weight: 741, TGA 10% weight loss temperature: 372° C.), 1,6-hexanediol-bis[3-(3,5-di-tert-butyl-4-hydroxyphenyl) propionate] (molecular weight: 639, TGA 10% weight loss temperature: 314° C.), triethylene glycol-bis[3-(3-tert-butyl-5-methyl-4-hydroxyphenyl)propionate] (molecular weight: 587, TGA 10% weight loss temperature: 311° C.), N,N'-hexamethylenebis(3,5-di-tert-butyl-4-hydroxycinnamamide) (molecular weight: 637, TGA 10% weight loss temperature: 330° C.), N,N'-bis[3-(3,5-di-tert-butyl-4-hydroxyphenyl) propionyl]hydrazine (molecular weight: 553, TGA 10% weight loss temperature: 304° C.), 2,2'-oxamide-bis-ethyl-3(3,5-di-tert-butyl-4-hydroxyphenyl)propionate (molecular weight: 697, TGA 10% weight loss temperature: 323° C.), 2,2'-methylene-bis(4-methyl-6-tert-butylphenol) terephthalate (molecular weight: 810, TGA 10% weight loss temperature: 327° C.), 1,3,5-tris[(3,5-di-tert-butyl-4-hydroxyphenyl) propionyloxyethyl]isocyanurate (molecular weight: 1,045, TGA 10% weight loss temperature: 346° C.), 2,2'-thio-diethylenebis[3-(3,5-di-tert-butyl-4-hydroxyphenyl)propionate, and 2,2-bis[4-{2-(3,5-di-tert-butyl-4-hydroxyhydrocinnamoyloxy)}ethoxyphenyl]propane (molecular weight: 836).

These compounds may be used singly or in combination.

Of the above-mentioned hindered phenol type antioxidants, phenol type antioxidants having functionality of 2 or more are preferred, and among therefrom, 3,9-bis[2-{3-(3-tert-butyl-4-hydroxy-5-methylphenyl) propionyloxy}-1,1-dimethylethyl]2,4,8,10-tetraoxaspiro[5,5]undecane, N,N'-hexamethylenebis(3,5-di-tert-butyl-4-hydroxycinnamamide), 1,1,3-tris(2-methyl-4-hydroxy-5-tert-butylphenyl)butane and n-octadecyl-3-(4'-hydroxy-3',5'-di-tert-butylphenyl)propionate are particularly preferred.

The resin composition of the invention contains a specific sulfur type antioxidant (D) as well as the above-mentioned hindered phenol type antioxidant (C).

The sulfur type antioxidant (D) used in the invention has a molecular weight of not less than 600, preferably not less than 620, more preferably not less than 650. Further, this sulfur type antioxidant (D) has a 10% weight loss temperature of not lower than 280° C., preferably not lower than 290° C., more preferably not lower than 300° C., in the thermogram measured in air.

Even if a sulfur type antioxidant having a molecular weight of less than 600 or having a 10% weight loss temperature of lower than 280° C. in the thermogram measured in air is used, the resultant composition loses the oxidation stabilizing function, because such sulfur type antioxidant is decomposed under heating during the preparation of the composition or the molding procedure of the composition. Moreover, since this decomposition of the antioxidant under heating causes foaming of the composition, a molded product formed from the composition tends to have defects.

The sulfur type antioxidant preferably used in the invention is a compound represented by the following formula [VI]:

$(R^1S-R^2-COOCH_2)_4C$     [VI]

wherein $R^1$ is a hydrocarbon group generally having 3 to 20 carbon atoms, preferably 5 to 20 carbon atoms; $R^2$ is a divalent hydrocarbon group generally having 1 to 5 carbon atoms, preferably 1 to 3 carbon atoms; and four of sulfur-containing groups linked to a carbon atom may be the same or different from each other.

A concrete example of the compound represented by the above formula [VI] is penta(erythrityl-tetra-β-mercaptolauryl)propionate (molecular weight: 1,160, TGA 10 % weight loss temperature: 300° C.).

Also employable as the sulfur type antioxidant other than the compound represented by the above formula [VI] is a compound represented by the following formula [VII]:

$S(R^4-COOR^3)_2$     [VII]

wherein $R^3$ is an alkyl group generally having 15 to 30 carbon atoms, preferably 18 to 30 carbon atoms; $R^3$ may contain a sulfur atom; and $R^4$ is a divalent aromatic group which may have an alkyl group, a divalent alicyclic alkyl group which may have an alkyl group, a divalent alkyl group or a single bond.

Concrete examples of the compound represented by the above formula [VII] include:

distearylthio-di-1,1'-methylpropionate (molecular weight: 696, TGA 10% weight loss temperature: 296° C.), myristylstearylthiodipropionate (molecular weight: 626, TGA 10% weight loss temperature: 284° C.), distearylthiodipropionate (molecular weight: 682, TGA 10% weight loss temperature: 292° C.), and distearylthiodibutyrate (molecular weight: 710, TGA 10 % weight loss temperature: 296° C.).

Of the above-mentioned sulfur type antioxidants (D), the compound represented by the formula [VII] shows particularly excellent heat stability when added to the aforementioned specific aromatic polyamide (A-1).

In the resin composition of the invention, the total amount of the hindered phenol type antioxidant (C) and the sulfur type antioxidant (D) is in the range of 0.2 to 4 parts by weight, preferably 0.5 to 2 parts by weight, based on 100 parts by weight of the resin components. Further, a weight ratio between the hindered phenol type antioxidant (C) and the sulfur type antioxidant (D) in the resin composition of the invention is in the range of 1:5 to 5:1, preferably in the range of 1:3 to 3.5 to 1, more preferably in the range of 1:1 to 3:1.

The above-mentioned hindered phenol type antioxidants and sulfur type antioxidants may be each used in combination.

The thermoplastic resin composition of the invention may further contain various additives such as inorganic fillers, organic fillers, heat stabilizers, weathering stabilizers, antistatic agents, anti-slip agents, anti-blocking agents, antifogging agents, lubricants, pigments, dyes, natural oils, synthetic oils and waxes, with the proviso that the properties of the composition are not marred.

For example, there can be mentioned glass fibers, carbon fibers and boron fibers as the inorganic fillers preferably used. Of these fibrous fillers, glass fibers are particularly preferred. By the use of the glass fibers, the composition can be improved in the moldability, and a molded product formed from the composition can be improved in the mechanical properties such as tensile strength, flexural strength and flexural modulus and the heat resistance such as heat distortion resistance. The glass fibers have a mean length of usually 0.1 to 20 mm, preferably 0.3 to 6 mm, and an aspect ratio of usually 10 to 2,000, preferably 30 to 600. In the invention, glass fibers having such mean length and aspect ratio as mentioned above are preferably used. The glass fibers are used generally in an amount of not more than 200 parts by weight, preferably in the range of 5 to 180 parts by weight, more preferably 5 to 150 parts by weight, based on 100 parts by weight of the resin components.

In addition to the inorganic fibrous fillers, there can be used fillers of other various forms such as those of particulate form, granular form, plate form, needle form, cross form and mat form.

Examples of such fillers include:

inorganic compounds such as silica, silica alumina, alumina, titanium oxide, talc, diatomaceous earth, clay, kaolin, glass, mica, gypsum, red oxide and zinc oxide, in the form of particle or plate;

inorganic compounds such as potassium titanium in the form of needle;

all aromatic polyamides such as polyparaphenylene terephthalamide, polymetaphenylene terephthalamide, polyparaphenylene isophthalamide, polymetaphenylene isophthalamide and condensates of diaminodiphenyl ether with terephthalic acids (or isophthalic acids), and condensates of para- (or meta-) aminobenzoic acids;

all aromatic polyamidoimide such as condensates of diaminodiphenyl ethers with trimellitic anhydrides or pyromellitic anhydrides;

heterocyclic ring-containing compounds such as all aromatic polyesters, all aromatic polyimides, polybenzimidazole and polyimidazophenanthroline; and polytetrafluoroethylene.

The above-mentioned fillers can be used in various forms such as forms of particle, plate, fiber and cross.

Of these fillers, particulate fillers are preferably used, and among therefrom, talc is particularly preferred.

The above fillers may be used as a mixture of two or more kinds. Further, they can be used after treated with silane coupling agents or titanium coupling agents. A mean particle diameter of the particulate fillers is usually in the range of 0.1 to 200 μm, preferably 1 to 100 μm.

The particulate filler is used generally in an amount of not more than 200 parts by weight, preferably not more than 100 parts by weight, particularly preferably in the range of 0.5 to 50 parts by weight, based on 100 parts by weight of the resin components contained in the composition.

The composition of the invention may furthermore contain heat-resistant resins, with the proviso that the properties of the composition are not marred. Examples of the heat-resistant thermoplastic resins include PPS (polyphenylene sulfide), PPE (polyphenylene ether), PES (polyether sulfone), PEI (polyether imide) and LCP (liquid crystal polymer). Also employable are modified products of these resins. In the invention, polyphenylene ether and polyphenylene sulfide are particularly preferred. A content of the heat-resistant thermoplastic resin in the composition is usually less than 50% by weight, preferably in the range of 0 to 40% by weight.

The thermoplastic resin composition of the invention can be prepared, for example, by mixing the aromatic polyamide (A), the modified polymer (B), the specific hindered phenol type antioxidant (C) and the specific sulfur type antioxidant (D), and then kneading the resultant mixture. The temperature in the kneading procedure is generally set to a temperature not lower than a melting point of a resin having the highest melting point, namely, a temperature not lower than a melting point of the aromatic polyamide (A). For kneading of the mixture, a known melt-kneading device can be used.

Through the kneading, a dispersion wherein the modified polymer (B) is finely dispersed in the aromatic polyamide (A), so-called "polymer alloy", is formed.

The thermoplastic resin composition of the invention comprising the aromatic polyamide (A), the modified polymer (B), the specific hindered phenol type antioxidant (C) and the specific sulfur type antioxidant (D) is free from foaming during the preparation of the composition, has no evil effect of metal and is free from gas burning during the molding procedure of the composition. Moreover, a molded product obtained from this composition is excellent in heat resistance, low water absorption properties and thermal aging resistance.

The thermoplastic resin composition comprising such components as mentioned above has a heat distortion temperature (heat deflection temperature, measured under a load of 18.6 kg) of usually 70° to 150° C., preferably 80° to 120° C., and this resin composition shows prominently high heat resistance although the polyamide resin composition is thermoplastic.

Further, this resin composition has a specific gravity of usually 1.05 to 1.12, and in most cases, about 1.08 to 1.10. Accordingly, as is evident from the comparison with polybutylene terephthalate having a specific gravity of about 1.31 or nylon 66 having a specific gravity of about 1.14, which has been relatively widely used as a resin for preparing a molded product, a molded product formed from the resin composition of the invention is lightweight.

Using the thermoplastic resin composition prepared as above, a molded product having a desired shape can be produced by means of a melt molding method generally used such as compression molding, injection molding or extrusion molding.

For example, the resin composition of the invention is introduced into an injection molding machine having a cylinder temperature of 280° to 350° C. to melt the resin composition, and the molten composition is transferred into a mold of predetermined shape to produce a molded product.

There is no specific limitation on the shape of a molded product produced from the thermoplastic resin composition of the invention, and for example, the composition of the invention can be used as a resin for forming electric tools, ordinary industrial parts, mechanical parts such as gear and cam, and electronic parts such as printable circuit board and housing for electronic part. Further, the resin composition of the invention is suitable as a resin for forming automotive interior or exterior trim parts, engine room parts, and automotive electrical parts.

Owing to such combination of resins and antioxidants as mentioned above, the resin composition of the invention shows prominently improved thermal aging resistance which cannot be obtained in the case of using aliphatic polyamide such as nylon 66.

The thermoplastic resin composition of the invention is very useful as a resin for forming a connector for connecting electronic circuits with each other. That is, a connector formed from the resin composition of the invention using an injection molding machine or the like not only has excellent heat resistance but also is hardly reduced in toughness after temporarily heated. Recently, electrical parts equipped with such a connector as mentioned above come to be often used by soldering them utilizing an infrared reflow method or the like, and hence the conventional connector is sometimes reduced in toughness by the heat of the infrared reflow method. In accordance with reduction of toughness, the elongation rate of the connector lowers, and thereby a connecting operation (fitting operation) of connectors cannot be smoothly carried out in some cases. Further, the connector is reduced in toughness by heating when used in an automotive engine room, and thereby a durability of the connector is also reduced. However, the connector formed from the thermoplastic resin composition of the invention is hardly reduced in the toughness, and the elongation rate necessary for connectors can be kept even when the connector is heated. Accordingly, the above-mentioned connecting operation can be easily carried out, and the durability of the connector can be also improved.

Particularly, the composition comprising the aromatic polyamide, the graft-modified cycloolefin copolymer, the hindered phenol type antioxidant and the sulfur type antioxidant has excellent properties required for engineering plastics.

EFFECT OF THE INVENTION

The thermoplastic resin composition of the present invention comprises polyamide having a specific melting point (A), a modified polymer (B), a specific hindered phenol type antioxidant (C) and a specific sulfur type antioxidant (D). Owing to those components, the antioxidants are never decomposed by the heat during the preparation of the composition, and therefore any foaming does not take place during the preparation of the composition and the molding procedure of the composition. Moreover, since the antioxidants used in the invention contain no metal, the thermoplastic resin composition of the invention is free from evil effects of metal. Further, the specific hindered phenol type antioxidant (C) and the specific sulfur type antioxidant (D) can provide prominently excellent properties to a polymer alloy of the polyamide (A) and the modified polymer (B). Hence, the resin composition of the invention suffer no gas burning during the molding procedure, and using this resin composition, a molded product excellent in heat resistance, low water absorption properties and thermal aging resistance can be obtained.

EXAMPLE

The present invention is further described with reference to examples, but it should be construed that the invention is in no way limited to those examples.

[Starting materials]

The following polyamides (A-1) to (A-3) were used as polyamides.

Aromatic polyamide (A-1): an aromatic polyamide resin derived from 1,6-diaminohexane, a terephthalic acid and an adipic acid (molar ratio between the terephthalic acid and the adipic acid=55:45)

Physical properties of this aromatic polyamide (A-1) are as follows.

Intrinsic viscosity (measured in a concentrated sulfuric acid at 30° C.): 1.6 dl/g Content of amino group: 0.037 m.equivalent/g (titrimetric value determined by the use of a paratoluenesulfonic acid in a metacresol solution)

Melting point: 312° C. Glass transition temperature: 80° C.

Aromatic polyamide (A-2),: an aromatic polyamide resin derived from 1,6-diaminohexane, a terephthalic acid and an adipic acid (molar ratio between the terephthalic acid and the adipic acid=45:55)

Physical properties of this aromatic polyamide (A-2) are as follows.

Intrinsic viscosity (measured in a concentrated sulfuric acid at 30° C.) : 1.00 dl/g Content of amino group: 0.037 m.equivalent/g (titrimetric value determined by the use of a paratoluenesulfonic acid in a metacresol solution)

Melting point: 305° C. Glass transition temperature: 77° C.

Aliphatic polyamide (A-3): nylon 66

Physical properties of this aliphatic polyamide (A-3) are as follows.

Intrinsic viscosity (measured in a concentrated sulfuric acid at 30° C.): 1.26 dl/g Content of amino group: 0.038 m.equivalent/g (titrimetric value determined by the use of a paratoluenesulfonic acid in a metacresol solution)

Melting point: 266° C. Glass transition temperature: 53° C.

Synthesis Example

[Preparation of graft-modified polymer (B-1)]

A hydrogenated styrene/butadiene/styrene block copolymer (trade name: Taftec H1041, available from Asahi Kasei Kogyo K.K.) obtained by hydrogenating a styrene/butadiene/styrene block copolymer is graft polymerized with maleic anhydride, to obtain a maleic anhydride graft-modified hydrogenated styrene/butadiene/styrene block copolymer (B-1). In this copolymer, the grafting amount of the maleic anhydride was 2% by weight.

[Preparation of graft-modified cycloolefin polymer (B-2)]

To 5 kg of a random copolymer of ethylene and 1,4,5,8-dimethano-1,2,3,4,4a,5,8,8a-octahydronaphthalene (another name: tetracyclo[4.4.0.1$^{2,5}$.1$^{7,10}$]-3-dodecene, sometimes abbreviated to "IDMON" hereinafter) having an ethylene content (measured by $^{13}$C-NMR) of 62% by mol, MFR (260° C.) of 15 g/10 min, an intrinsic viscosity [η] (as measured in decalin at 135° C.) of 0.6 dl/g and a glass transition temperature of 130° C. were added a solution comprising 25 g of acetone and 50 g of maleic anhydride and 3 g of organic peroxide (Perhexyne™, available from Nippon Yushi K.K.), and they were well mixed. The resultant mixture was melted by means of a twin-screw extruder (PCM 45, produced by Ikegai Tekko K.K.) at a cylinder temperature of 250° C. to perform a reaction. The obtained reaction product was pelletized using a pelletizer.

The resin thus obtained had a maleic acid content of 0.8% by weight, an intrinsic viscosity [η] as measured in decalin at 135° C. of 0.42 dl/g, and a glass transition temperature of 145° C.

Properties of this graft-modified cycloolefin polymer (B-2) were measured on the following test items.

Tensile strength (TS): measured in accordance with ASTM-D-638.

Elongation at break (EL): measured in accordance with ASTM-D-638.

Flexural strength: measured in accordance with ASTM-D-790.

Flexural modulus: measured in accordance with ASTM-D-790.

Izod impact strength: measured in accordance with ASTM-D-256 (with notch, temperature of measurement: 23° C.).

Heat distortion temperature (HDT): measured in accordance with ASTM-D-648.

The results are set forth in Table A.

TABLE A

| Properties | Property value |
|---|---|
| Tensile strength at break (kg/cm$^2$) [23° C., absolute dryness] | 610 |
| Elongation at break (%) [23° C., absolute dryness] | 3 |
| Flexural strength (kg/cm$^2$) [23° C., absolute dryness] | 1,100 |
| Flexural modulus (kg/cm$^2$) [23° C., absolute dryness] | 32,000 |
| Izod impact strength (kg · cm/cm) [23° C., with notch] | 3 |
| Heat distortion temperature (°C.) [load: 264 psi] | 125 |
| Water absorption rate (%) 1 day in water at 23° C. | <0.01 |

Hindered phenol type antioxidant

Compounds (C-1) to (C-4) set forth in Table 1 were used as hindered phenol type antioxidants. In Table 1, a molecular weight and a TGA 10% weight loss temperature of each compound are also set forth.

TABLE 1

| | Name of Compound | Molecular weight | TGA 10 weight loss temperature (°C.) |
|---|---|---|---|
| (C-1) | 3,9-bis[2-{3-(3-tert-butyl-4-hydroxy-5-methylphenyl)propionyloxy}-1,1-dimethylethyl]2,4,8,10-tetraoxaspiro[5,5]undecane | 741 | 372 |
| (C-2) | N,N'-hexamethylenebis(3,5-di-tert-butyl-4-hydroxycinnamamide) | 637 | 330 |
| (C-3) | 1,1,3-tris(2-methyl-4-hydroxy-5-tert-butylphenyl)butane | 544 | 323 |
| (C-4) | 4,4'-butylidene-bis(6-tert-butyl-m-cresol) | 382 | 320 |

Sulfur type antioxidant

Compounds (D-1) to (D-3) set forth in Table 2 were used as sulfur type antioxidants. In Table 2, a molecular weight and a TGA 10% weight loss temperature of each compound are also set forth.

TABLE 2

| | Name of Compound | Molecular weight | TGA 10 weight loss temperature (°C.) |
|---|---|---|---|
| (D-1) | penta(erythrityl-tetra-β-mercaptolauryl)propionate | 1,160 | 300 |
| (D-2) | distearylthiodipropionate | 682 | 292 |
| (D-3) | ditridecylthiodipropionate | 542 | 272 |

Phosphorus type stabilizer

As a phosphorus type stabilizer, bis(2,6-di-tert-butyl-4-methylphenyl)pentaerythritol-di-phosphite was prepared.

Examples 1–7, Comparative Examples 1–6

The aforementioned polyamide, the graft-modified polymer prepared by Synthesis Example, the hindered phenol type antioxidant set forth in Table 1, and the sulfur type antioxidant set forth in Table 2 and, if necessary, the above-mentioned phosphorus type stabilizer were mixed in amounts set forth in Table 3. The resulting mixture was melted and kneaded in a twin-screw extruder, and then pelletized. The twin-screw extruder used herein was PCM-45 produced by Ikegai Tekko K.K., and the cylinder temperature was set to 320° C. The pellets thus obtained were molded into a molded product by means of injection molding.

Separately, using the pellets obtained as above, an injection-molded specimen was prepared. The properties of the specimen were measured in the same manner as mentioned above.

Further, the specimen was evaluated on the thermal aging resistance by measuring TS and EL of the specimen after the specimen was annealed at 150° C. for 600 hours and 1,000 hours.

The results are set forth in Table 4.

TABLE 3 (I)

| | | Example | | | | | | |
|---|---|---|---|---|---|---|---|---|
| | | 1 | 2 | 3 | 4 | 5 | 6 | 7 |
| Polyamide resin | A-1 | 80 | 80 | 80 | 80 | 80 | 80 | — |
| | A-2 | — | — | — | — | — | — | 60 |
| | A-3 | — | — | — | — | — | — | — |
| Graft-modified polymer | B-1 | 20 | 20 | 20 | 20 | 20 | 20 | 15 |
| | B-2 | — | — | — | — | — | — | 25 |
| Hindered phenol antioxidant | C-1 | 0.5 | 0.75 | 0.25 | — | — | 0.5 | 0.5 |
| | C-2 | — | — | — | 0.5 | — | — | — |
| | C-3 | — | — | — | — | 0.5 | — | — |
| | C-4 | — | — | — | — | — | — | — |
| Sulfur antioxidant | D-1 | 0.5 | 0.25 | 0.75 | 0.5 | 0.5 | — | 0.5 |
| | D-2 | — | — | — | — | — | 0.5 | — |
| | D-3 | — | — | — | — | — | — | — |
| Phosphorus Stabilizer | | — | — | — | — | — | — | — |

TABLE 3 (II)

| | | Comparative Example | | | | | |
|---|---|---|---|---|---|---|---|
| | | 1 | 2 | 3 | 4 | 5 | 6 |
| Polyamide resin | A-1 | — | 80 | 80 | 80 | 80 | 80 |
| | A-2 | — | — | — | — | — | — |
| | A-3 | 80 | — | — | — | — | — |

TABLE 3 (II)-continued

|  |  | Comparative Example | | | | | |
|---|---|---|---|---|---|---|---|
|  |  | 1 | 2 | 3 | 4 | 5 | 6 |
| Graft-modified polymer | B-1 | 20 | 20 | 20 | 20 | 20 | 20 |
|  | B-2 | — | — | — | — | — | — |
| Hindered phenol antioxidant | C-1 | 0.5 | 0.5 | — | 0.5 | 0.5 | — |
|  | C-2 | — | — | — | — | — | — |
|  | C-3 | — | — | — | — | — | — |
|  | C-4 | — | — | 0.5 | — | — | — |
| Sulfur antioxidant | D-1 | 0.5 | — | 0.5 | — | — | 0.5 |
|  | D-2 | — | — | — | — | — | — |
|  | D-3 | — | — | — | 0.5 | — | — |
| Phosphorus Stabilizer |  | — | 0.5 | — | — | — | — |

TABLE 4

|  |  | Example | | | | | | | Comparative Example | | | | | |
|---|---|---|---|---|---|---|---|---|---|---|---|---|---|---|
|  |  | 1 | 2 | 3 | 4 | 5 | 6 | 7 | 1 | 2 | 3 | 4 | 5 | 6 |
| Initial physical properties |  |  |  |  |  |  |  |  |  |  |  |  |  |  |
| Heat distortion temperature (°C.) |  | 95 | 94 | 94 | 93 | 93 | 94 | 90 | 69 | 93 | 98 | 93 | 94 | 94 |
| Flexural strength (kg/cm$^2$) |  | 902 | 882 | 857 | 886 | 861 | 870 | 950 | 788 | 886 | 832 | 851 | 893 | 882 |
| Fexural modulus (×10$^2$ kg/cm$^2$) |  | 213 | 210 | 206 | 211 | 207 | 204 | 220 | 197 | 211 | 205 | 210 | 208 | 210 |
| IZOD impact strength (kgf · cm/cm) |  | 94 | 92 | 93 | 87 | 91 | 88 | 10 | 110 | 100 | 94 | 89 | 92 | 92 |
| Tensile strength (kg/cm$^2$) |  | 646 | 640 | 627 | 638 | 625 | 633 | 550 | 518 | 639 | 614 | 626 | 638 | 627 |
| Elongation at break (%) |  | 44 | 34 | 45 | 31 | 46 | 45 | 20 | >50 | 45 | 33 | 29 | 48 | 50 |
| Physical properties after annealing at 150° C. |  |  |  |  |  |  |  |  |  |  |  |  |  |  |
| 600 hrs | Tensile strength (Kg/cm$^2$) | 684 | 680 | 666 | 674 | 667 | 666 | 550 | 530 | 693 | 652 | 657 | 667 | 604 |
|  | Elongation at break (%) | 18 | 18 | 19 | 16 | 18 | 15 | 13 | 8 | 16 | 17 | 9 | 6 | 4 |
| 1000 hrs | Tensile strength (Kg/cm$^2$) | 681 | 682 | 658 | 675 | 660 | 658 | 550 | 500 | 690 | 653 | 641 | 654 | 654 |
|  | Elongation at break (%) | 15 | 15 | 12 | 12 | 13 | 9 | 10 | 4 | 12 | 5 | 5 | 5 | 3 |
| State of composition |  | good | good | good | good | good | good | good | good | foamed | good | good | good | good |

What is claimed is:

1. A thermoplastic resin composition comprising:
(A) aromatic polyamide comprising repeating units formed from:
  dicarboxylic acid constituent units comprising 40–100% by mol of terephthalic acid constituent units,
  0–50% by mol of aromatic dicarboxylic acid constituent units other than terephthalic acid constituent units and/or
  0–60% by mol of aliphatic dicarboxylic acid constituent units having 4 to 20 carbon atoms; and
  diamine constituent units comprising aliphatic diamine constituent units and/or alicyclic diamine constituent units, said aromatic polyamide having an intrinsic viscosity, as measured in a concentrated sulfuric acid at 30° C., of 0.5 to 3.0 dl/g and a melting point of not lower than 280° C.;
(B) at least one polymer selected from the group consisting of
  a graft-modified product of a random copolymer comprising two different α-olefins, and
  a graft-modified product of an aromatic vinyl hydrocarbon/conjugated diene copolymer or a hydrogenation product thereof, wherein said graft-modified products are produced by grafting unmodified polymer with an unsaturated carboxylic acid or an unsaturated carboxylic acid derivative;
(C) a hindered phenol antioxidant having a molecular weight of not less than 500 and a 10% weight loss temperature of not lower than 300° C. in a thermogram measured in air; and
(D) a sulfur antioxidant having a molecular weight of not less than 600 and a 10% weight loss temperature of not lower than 280° C. in a thermogram measured in air represented by the following formula $$(R^1S-R^2-COOCH_2)_4C$$

wherein $R^1$ is a hydrocarbon group of 3 to 20 carbon atoms and $R^2$ is a divalent hydrocarbon group of 1 to 5 carbon atoms;

wherein the polymer component (B) is contained in an amount of 2 to 50 parts by weight based on 100 parts by weight of the polyamide (A);
  and wherein the total amount of the hindered phenol antioxidant (C) and the sulfur antioxidant (D) is in the range of 0.2 to 4 parts by weight based on the total amount of the polyamide (A) and the polymer (B).

2. The thermoplastic resin composition as claimed in claim 1, wherein a weight ratio between the hindered phenol antioxidant (C) and the sulfur antioxidant (D) is in the range of 1:5 to 5:1.

3. The thermoplastic resin composition as claimed in claim 2, wherein the sulfur antioxidant (D) is pentaerythrityl-tetra(β-mercaptolauryl propionate).

4. A resin molded product made of the thermoplastic resin composition as claimed in claim 3.

5. A resin molded product made of the thermoplastic resin composition as claimed in claim 2.

6. The thermoplastic resin composition as claimed in claim 1, wherein the sulfur antioxidant (D) is pentaerythrityl-tetra-(β-mercaptolauryl propionate).

7. A resin molded product made of the thermoplastic resin composition as claimed in claim 6.

8. A resin molded product made of the thermoplastic resin composition as claimed in claim 1.

9. The composition of claim 1 which comprises
(A) said aromatic polyamide;
(B-1) said graft-modified product of a random copolymer comprising two different α-olefins;
(C) said hindered phenol antioxidant; and
(D) said sulfur antioxidant.

10. The composition of claim 1 which comprises
(A) said aromatic polyamide;
(B-3) said graft-modified product of an aromatic vinyl hydrocarbon/conjugated diene copolymer or a hydrogenation product thereof;
(C) said hindered phenol antioxidant; and
(D) said sulfur antioxidant.

11. The composition of claim 10 wherein the aromatic vinyl hydrocarbon/conjugated diene copolymer is styrene/butadiene block copolymer rubber, styrene/butadiene/styrene block copolymer rubber, styrene/isoprene block copolymer rubber, styrene/isoprene/styrene block copolymer rubber, hydrogenated styrene/butadiene/styrene block copolymer rubber, hydrogenated styrene/isoprene/styrene block copolymer rubber or styrene/butadiene random copolymer rubber and wherein the molar ratio of repeating units derived from the aromatic vinyl type hydrocarbon to repeating units derived from the conjugated diene is in the range of 10/90 to 70/30.

12. The composition of claim 11 wherein the graft-modified product (B-3) has a crystallinity, measured by X-ray diffractometry, of not more than 5%, a melt index of from about 1.0 to 20 g/10 min, a glass transition temperature of from about −80° to −20° C., an intrinsic viscosity (η), measured in decalin at 135° C., of from about 1 to 5 dl/g, and a tensile modulus of from about 1 to 15,000 kg/cm².

13. The composition of claim 1 which comprises
(A) said aromatic polyamide;
(B-1) said graft-modified product of a random copolymer comprising two different α-olefins;
(B-3) said graft-modified product of an aromatic vinyl hydrocarbon/conjugated diene copolymer or a hydrogenation product thereof;
(C) said hindered phenol antioxidant; and
(D) said sulfur antioxidant.

14. The composition of claim 1 wherein in the aromatic polyamide (A) the amount of the dicarboxylic acid constituent units comprise 40 to 80 mol percent of terephthalic acid units.

15. The composition of claim 1 wherein the aromatic polyamide (A) has a melting point of higher than 290° C.

* * * * *